Dec. 18, 1945.  C. B. DE VLIEG  2,390,994
METHOD OF AND APPARATUS FOR MAKING IMPELLER WHEELS
Filed Aug. 18, 1941  13 Sheets-Sheet 1
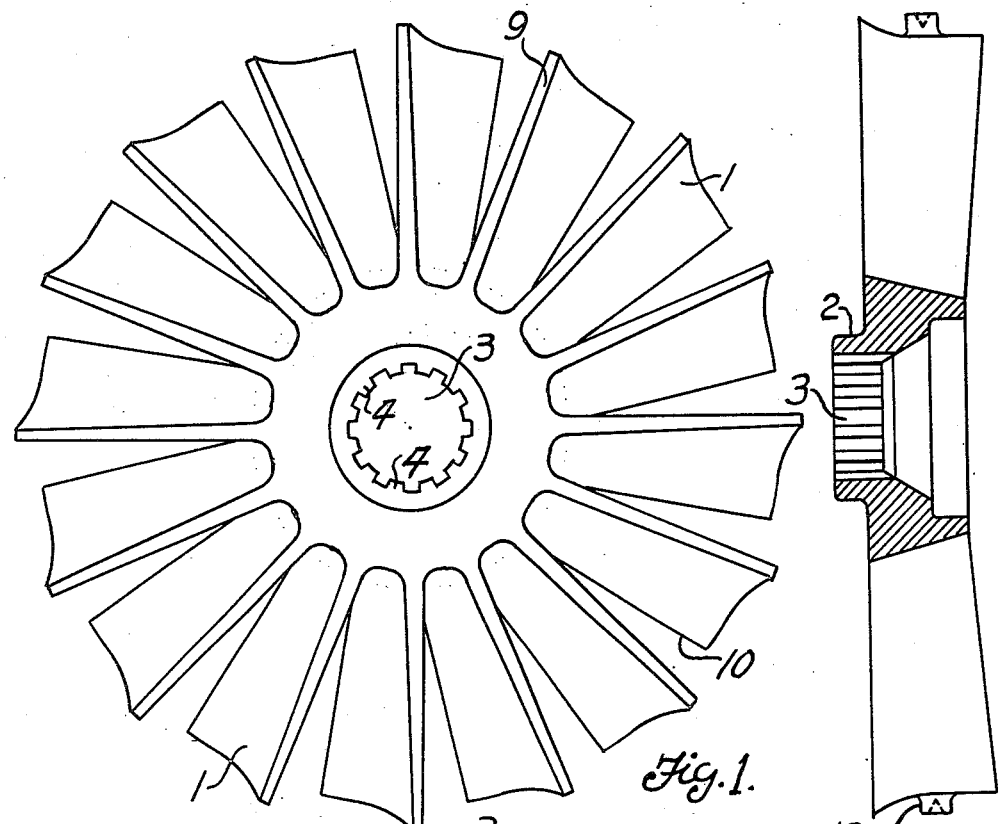
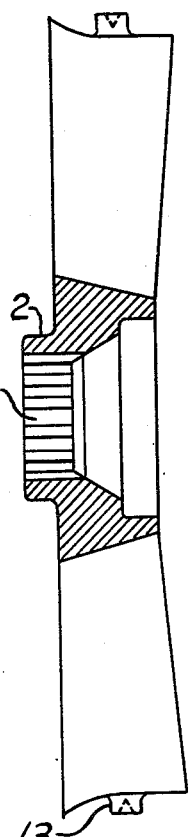
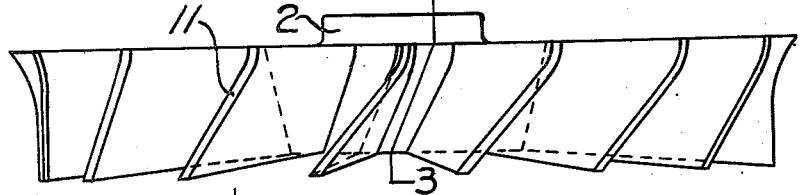
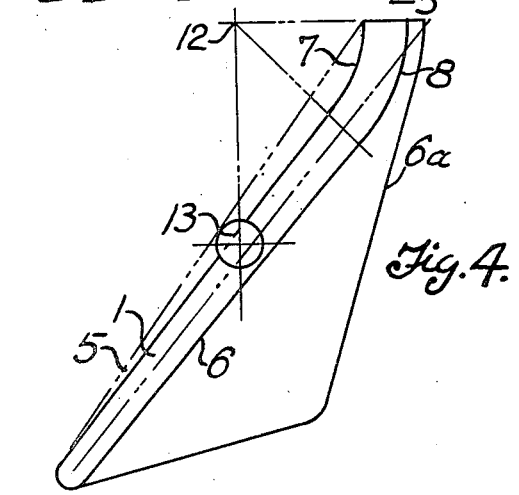
Inventor
CHARLES B. DeVLIEG.
By
Alfred T. Rees
Attorney

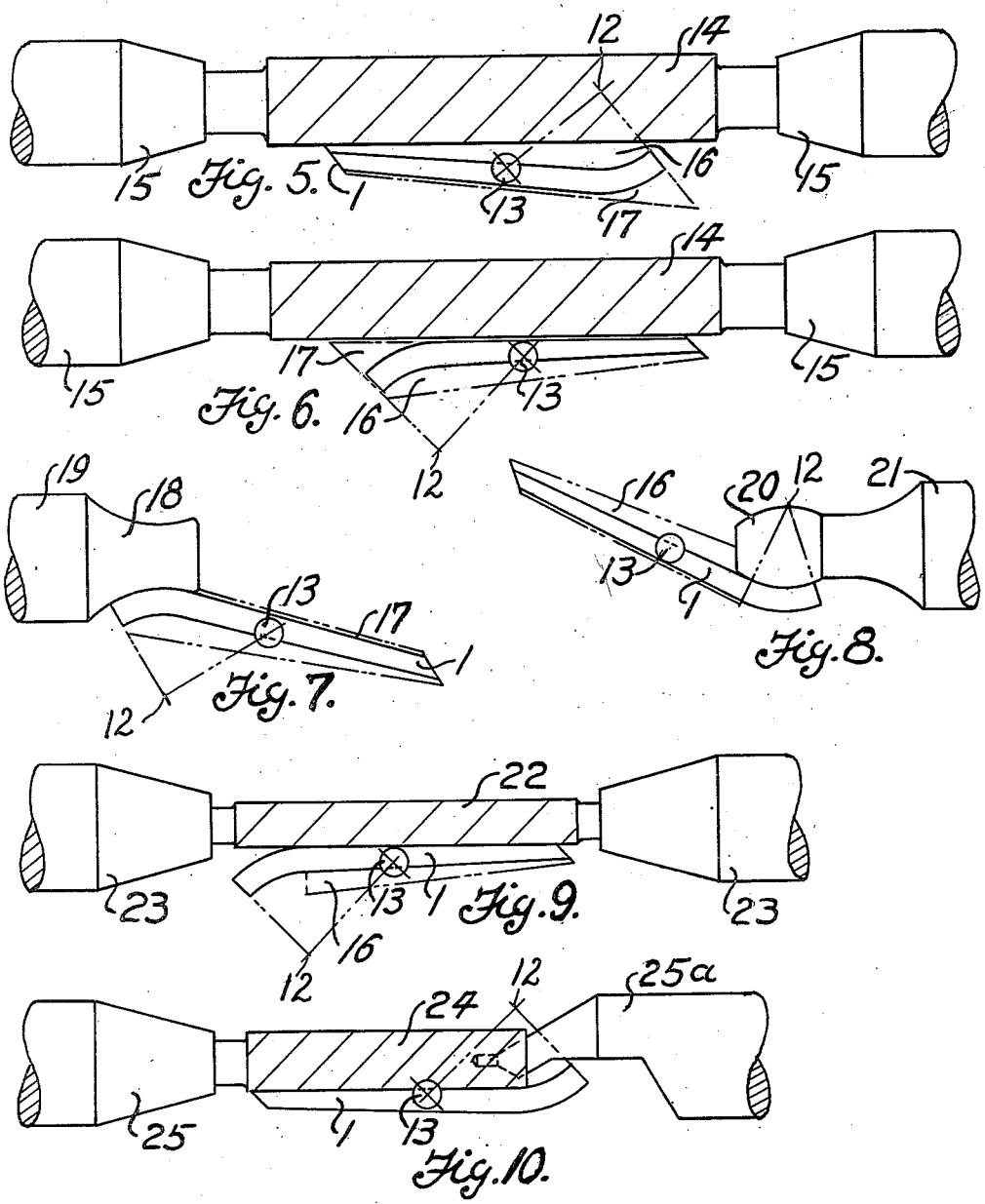

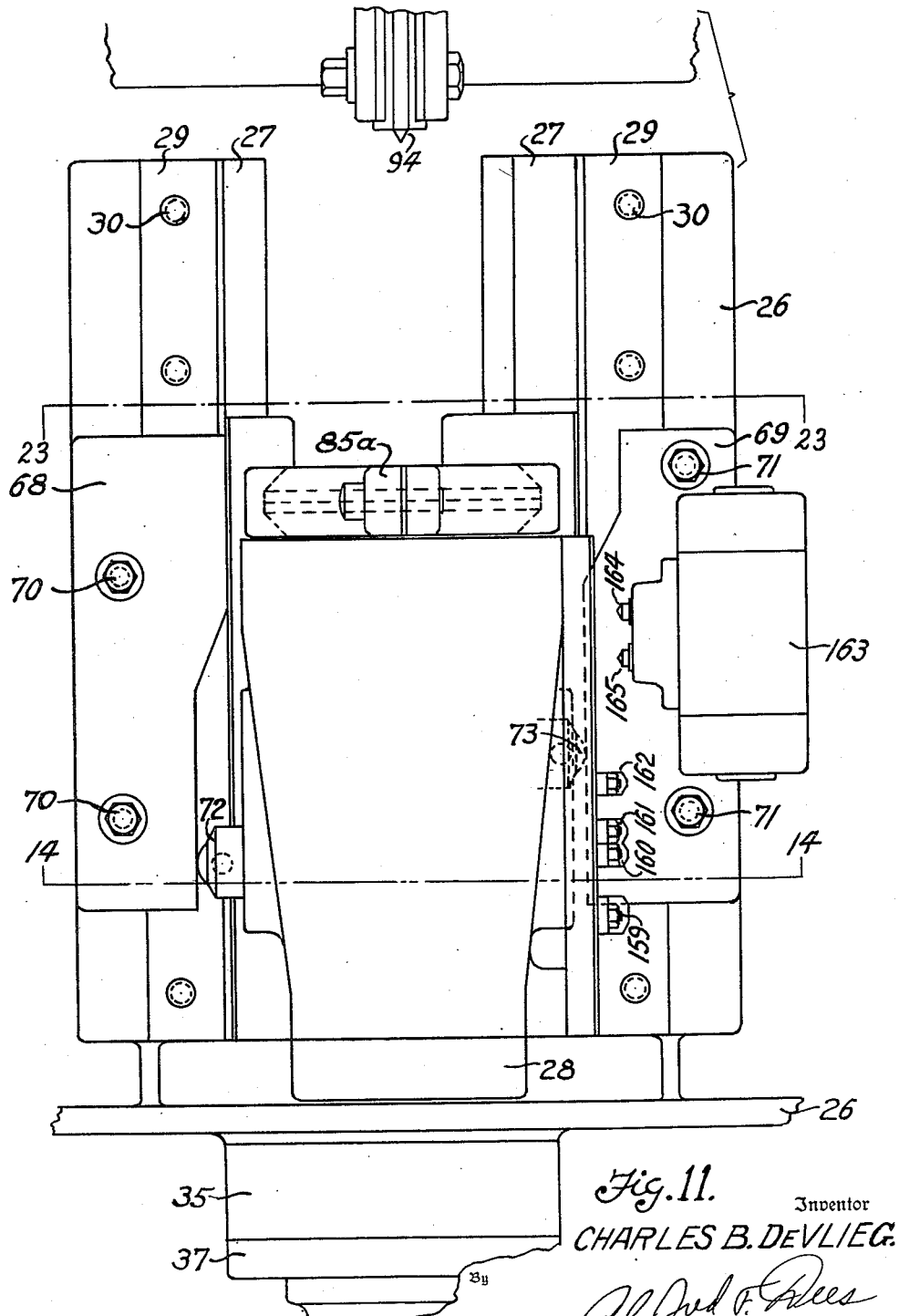

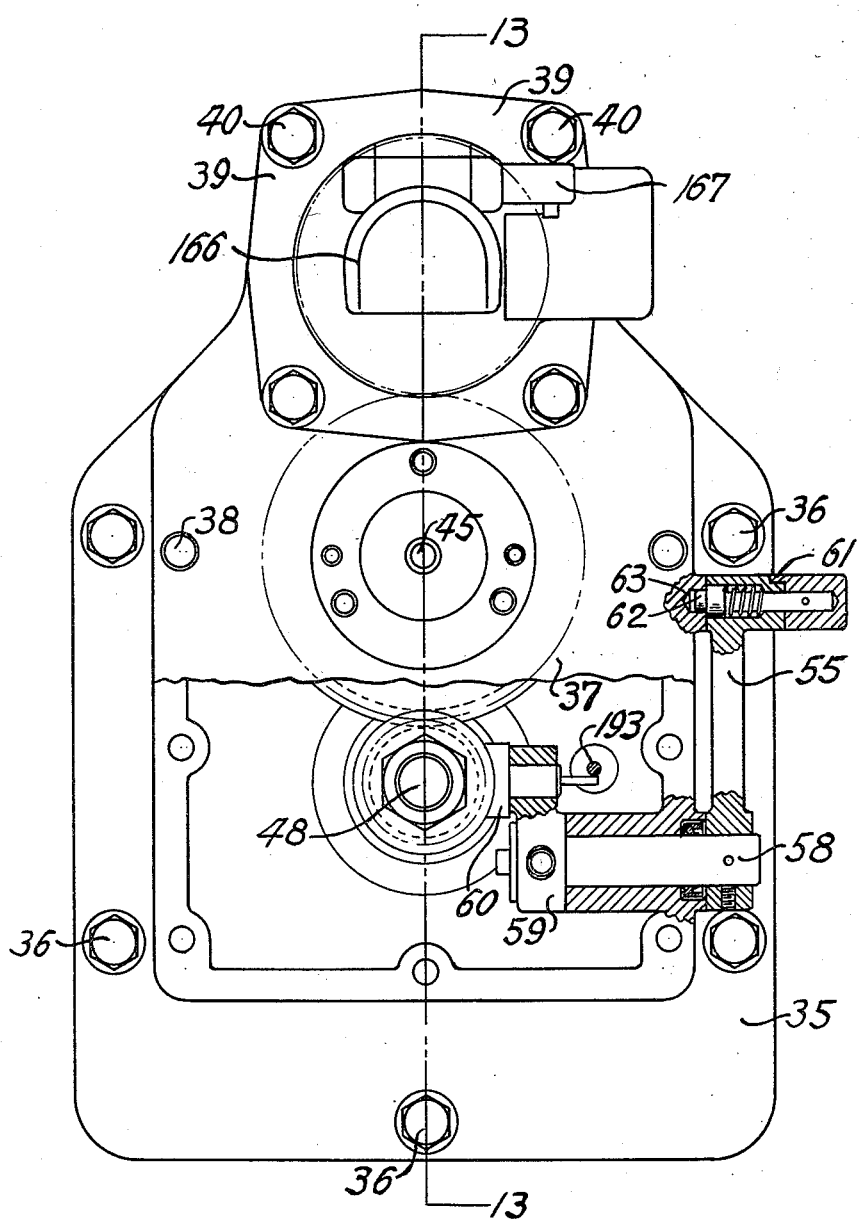

Inventor
CHARLES B. DeVLIEG.
Attorney

Dec. 18, 1945.  C. B. DE VLIEG  2,390,994
METHOD OF AND APPARATUS FOR MAKING IMPELLER WHEELS
Filed Aug. 18, 1941  13 Sheets-Sheet 6

Inventor
CHARLES B. DEVLIEG.
By Alfred F. Dees
Attorney

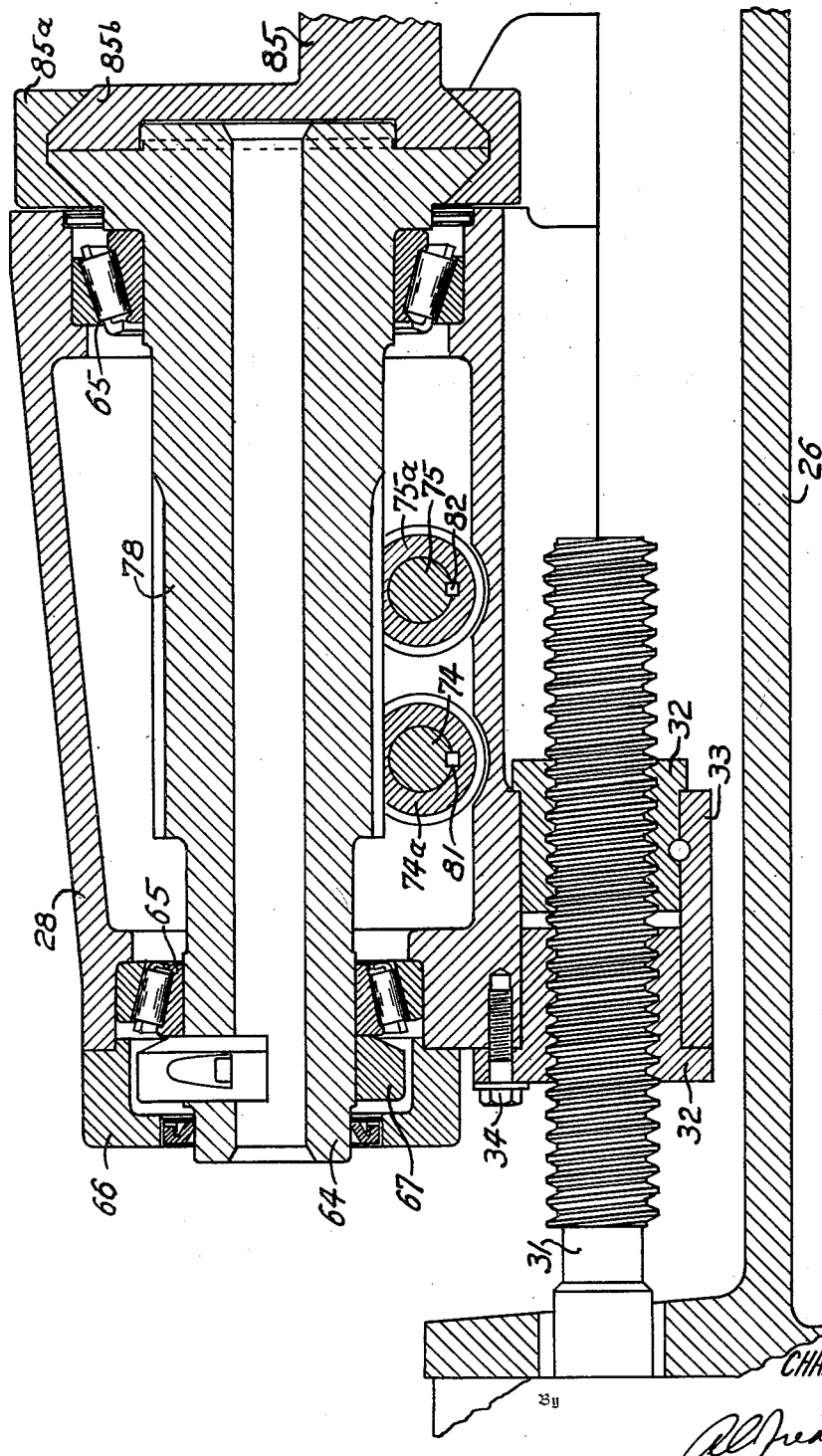

Dec. 18, 1945.  C. B. DE VLIEG  2,390,994
METHOD OF AND APPARATUS FOR MAKING IMPELLER WHEELS
Filed Aug. 18, 1941  13 Sheets-Sheet 8
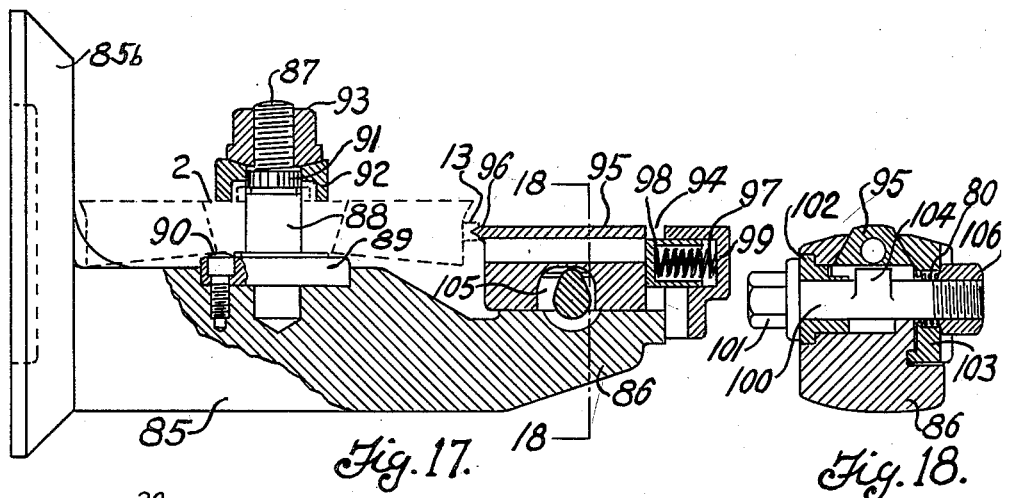
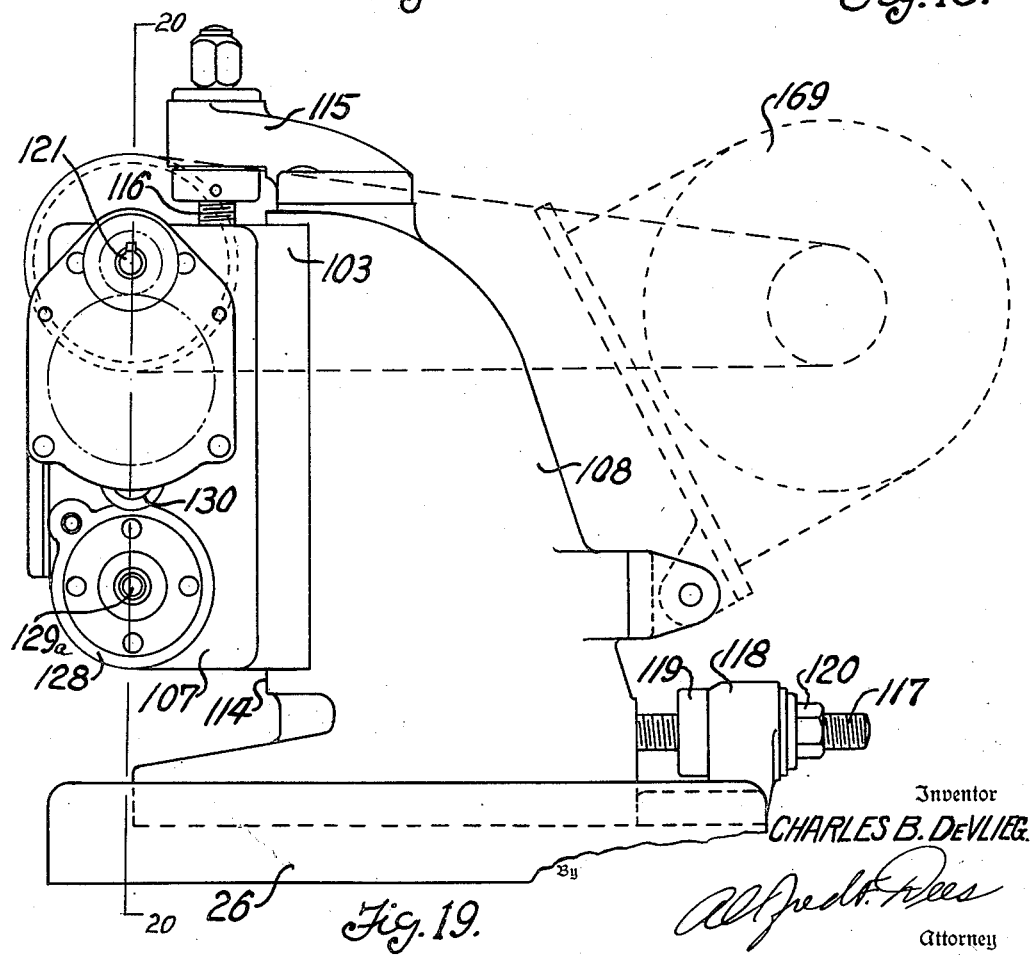
Inventor
CHARLES B. DEVLIEG.
Attorney Dec. 18, 1945.     C. B. DE VLIEG     2,390,994
METHOD OF AND APPARATUS FOR MAKING IMPELLER WHEELS
Filed Aug. 18, 1941     13 Sheets-Sheet 9

Inventor
CHARLES B. DeVLIEG.
By
Attorney

Inventor
CHARLES B. DEVLIEG.
Attorney

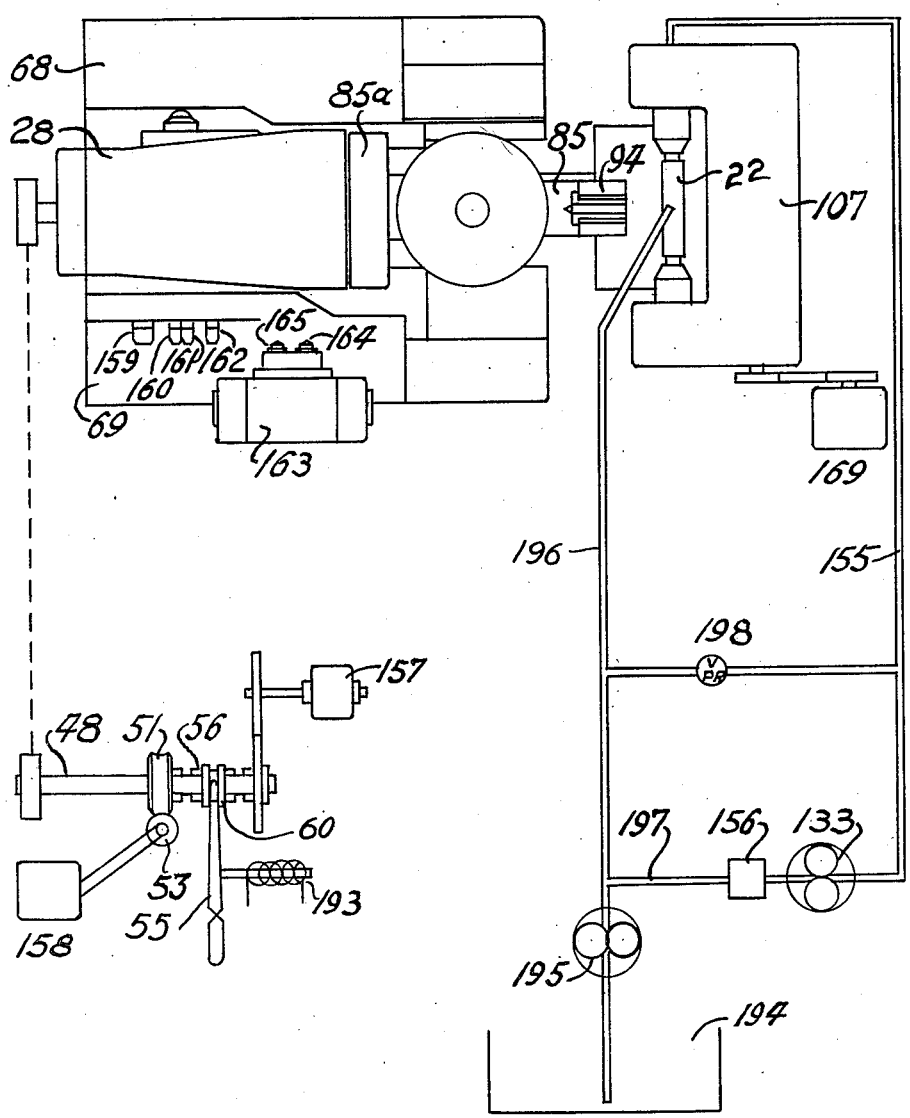

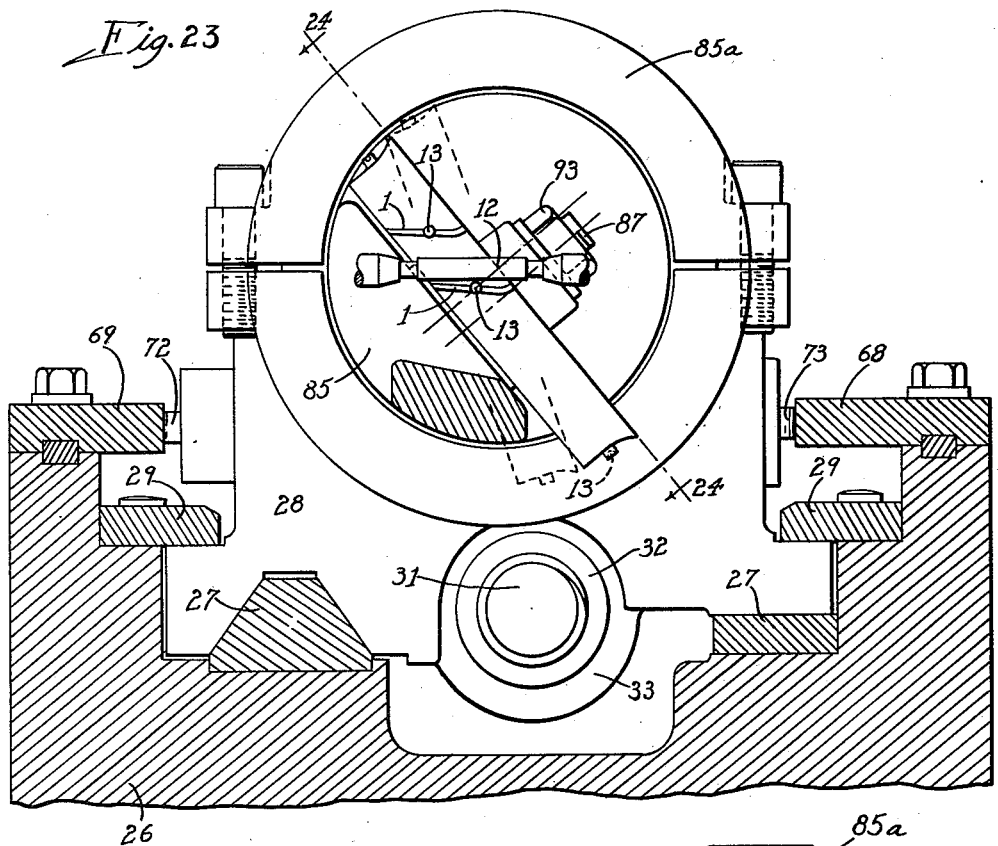
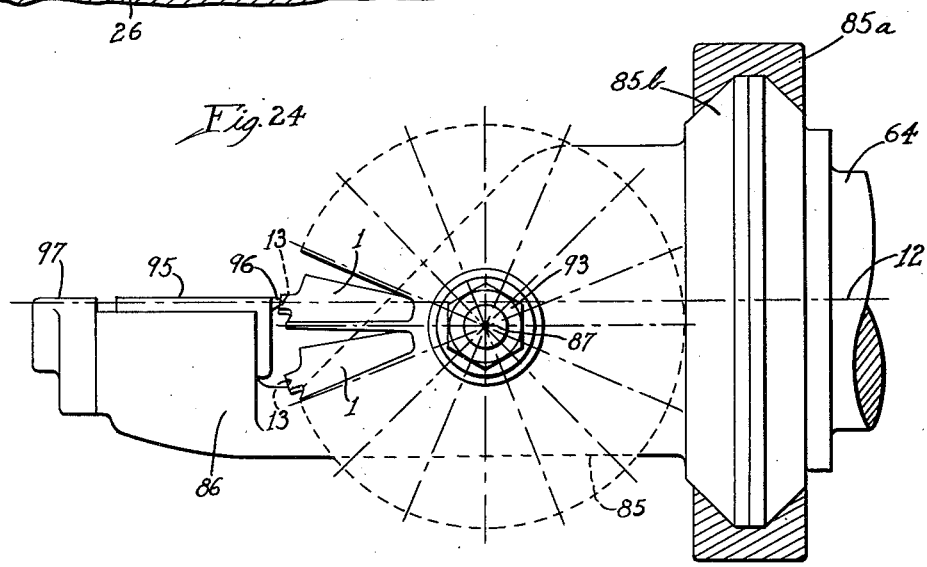

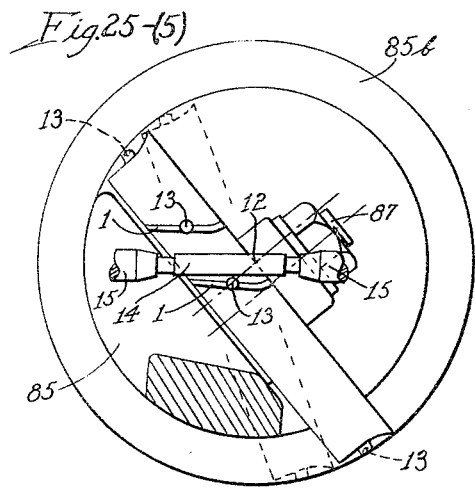
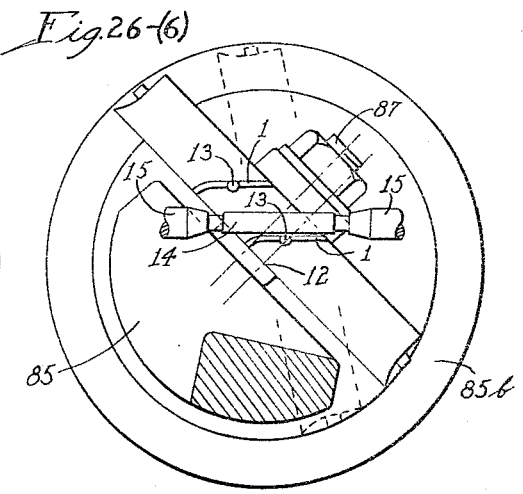
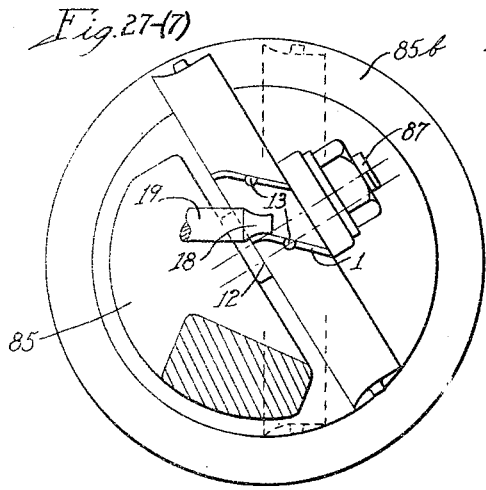
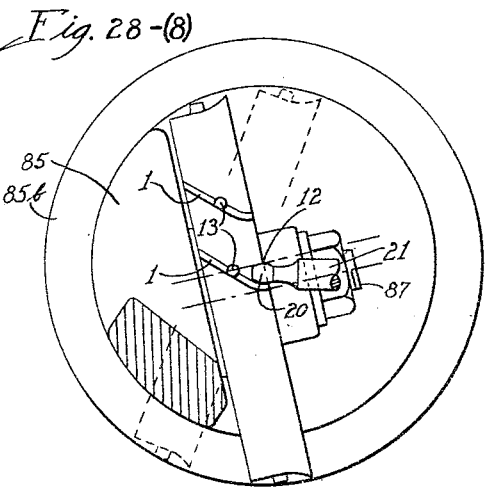
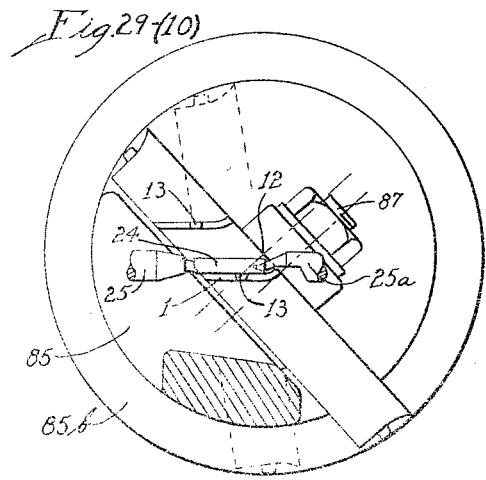

Patented Dec. 18, 1945

2,390,994

UNITED STATES PATENT OFFICE 2,390,994

METHOD OF AND APPARATUS FOR MAKING IMPELLER WHEELS

Charles B. De Vlieg, Detroit, Mich.

Application August 18, 1941, Serial No. 407,287

43 Claims. (Cl. 29—23.5)

This invention concerns machine tools and in its more specific aspects relates to a metal working tool and a method for forming impeller wheels for super-chargers and to the machine for producing one or more steps in a sequence of machining operations.

The object of this invention is to form an impeller wheel for a super-charger in a series of progressive machining steps.

A further object of the invention is to form an impeller wheel in which complemental surfaces of the various portions of the wheel are integrated with respect to each other.

Another object of the invention is to form an impeller wheel for a super-charger in which the several surfaces of each vane on the impeller are formed about a common axis of rotation.

A still further object of the invention is to form the individual vanes of the impeller wheel of a super-charger by means of a succession of milling cuts in which there is a horizontally disposed cutting tool applied to a rotating and axially moving work piece to form a succession of integrated surfaces thereon.

Another object of the invention is to construct a machine tool in which a rotating cutter is applied to a progressively forward moving and transversely rotating work piece.

Another and further object of the invention is to provide in a machine tool a work support that is moved relative to the cutter and which imposes on each individual portion of the work piece a combined horizontal and rotative movement.

A still further object of the invention is to construct a machine tool having a work supporting element that is adapted to move relatively of the cutter and which is adapted to bodily move the work piece and simultaneously rotate it about a transverse axis so as to form a plurality of integrated surfaces on each portion of the work piece.

Another and still further object of the invention is to provide a machine tool for forming a plurality of integrated surfaces on a portion of a work piece, which will hold the work piece against possible rotative or lateral displacement relative to the work supporting means and which will simultaneously impose a uniform compressive force on each individual portion of the work piece while it is being supported in the work support to thereby form an unvarying plurality of successive work pieces.

Another and further object of the invention is to provide a machine tool to form an integrated surface or surfaces on a work piece that uses small diameter cutters and provides two head-stocks for the cutter such that breakage will be prevented and the cutting operation performed to the root of each of the individual portions of the work piece.

A still further object of the invention is to provide a machine tool that interchangeably uses a plurality of forming tools and that still permits each individual portion of the work piece to operate about a common center of rotation.

A still further object of the invention is to provide a machine tool for forming a work piece having a plurality of integrated surfaces and that applies to each individual portion thereof a uniform compressive stress during the cutting operation and in the longitudinal direction of the work piece parts such that each part will be uniformly machined.

Another and still further object of the invention is to provide a machine tool work supporting and rotating element that holds the work against displacement in any direction which in conjunction with a spring tensioned tail-stock subjects the work piece and each individual portion thereof to a uniform stress to thereby aid in forming uniform surfaces as the work piece is subjected to a series of successive cutting operations.

A still further object of the invention is to construct a work support having a tail-stock thereon that subjects the work piece to a uniform compressive force which is unvarying in its application to each portion of a work piece.

A still further object of the invention is to provide a work holding means on a machine tool work support that will prevent the portions of the holder from moving or slipping relatively of the work piece as it is presented to the cutter.

Another and further object of the invention is to provide a tail-stock means for a relatively small diametered cutter that is adapted to lubricate itself and thereby prevent heating of the cutter and tail-stock.

Other objects are to provide a machine tool having a pressure lubricated tail-stock for a small diametered cutter in which the lubricant for the tail-stocks is mixed with the cutting oil or coolant.

Other and further objects of the invention will occur to those skilled in the arts to which this invention appertains as the description proceeds which taken in connection with the accompanying drawings sets forth the preferred embodiment of the invention and selected modifications thereof but such disclosures are not to be construed as a limitation of the invention which is limited only by the appended claims and any and all modifications, variations and alterations of structure coming within the spirit and scope thereof are deemed to be included herein.

In the drawings:

Figure 1 shows an elevational view of an impeller wheel.

Figure 2 shows a side view thereof.

Figure 3 is a section view taken along the line 3—3 of Figure 2.

Figure 4 shows an end view of one of the individual vanes of the impeller wheel shown in Figure 1 on an enlarged scale.

Figure 5 shows the arrangement of cutter and work piece for the gashing cut on the leading side of the impeller vane.

Figure 6 shows the arrangement of cutter and work piece for the gashing cut on the trailing side of the impeller vane.

Figure 7 shows the machining of the trailing convex side of the impeller vane.

Figure 8 shows the machining of the leading concave side of the impeller vane.

Figure 9 shows the machining operation of the trailing or rear side of the impeller vane.

Figure 10 shows the machining of the forward side of the impeller vane.

Figure 11 shows a plan view of a portion of the operating structure with the work holding fixture removed.

Figure 12 is an end elevational view of the tool head shown in Fig. 11.

Figure 16 shows a section view taken along the line 16—16 of Fig. 14.

Figure 17 shows an elevational view of the work holding fixture detached from the machine, with the work supporting post in a vertical plane and partly in section to show details of construction.

Figure 18 is a view taken along the line 18—18 of Figure 17.

Figure 19 shows a side elevational view of the cutter head.

Figure 22 shows an assembled diagrammatic view of the operating parts of the machine showing the work spindle moved to a position with the impeller wheel blank in a horizontal plane.

Figure 23 is a cross section taken substantially on the line 23—23 of Figure 11 showing the work holding fixture in an operative relation to a cutter corresponding with that shown in Figure 5.

Figure 24 is a diagrammatic section taken substantially along the line 24—24 of Figure 23.

Figures 25, 26, 27, 28 and 29 are diagrammatic endwise views of the work fixtures in different operative positions corresponding with the work and cutter relations shown in Figures 5, 6, 7, 8, and 10, respectively.

Figure 13:
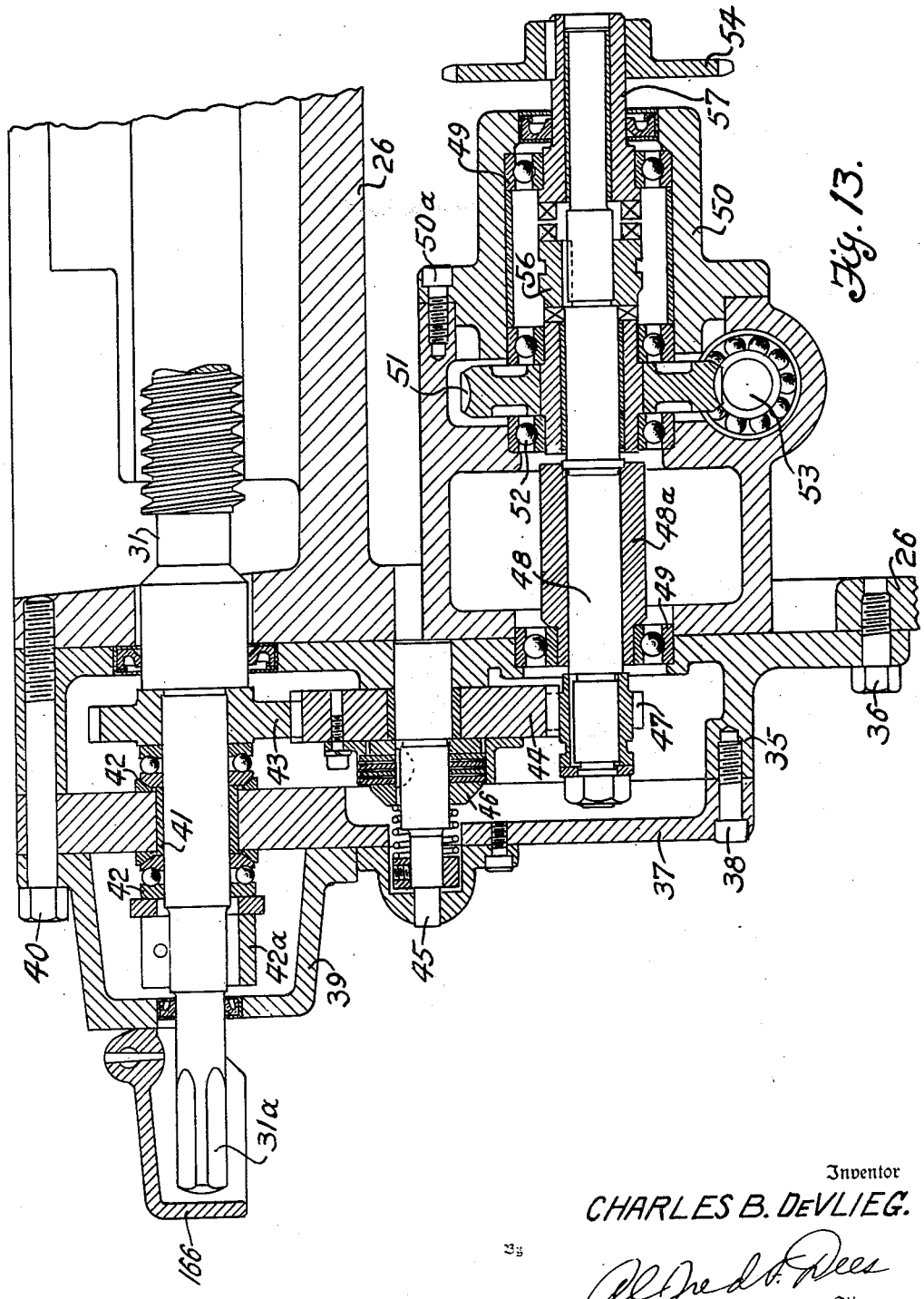
Figure 13 is a section view taken substantially along the line 13—13 of Figure 12.
Figures 14, 15:
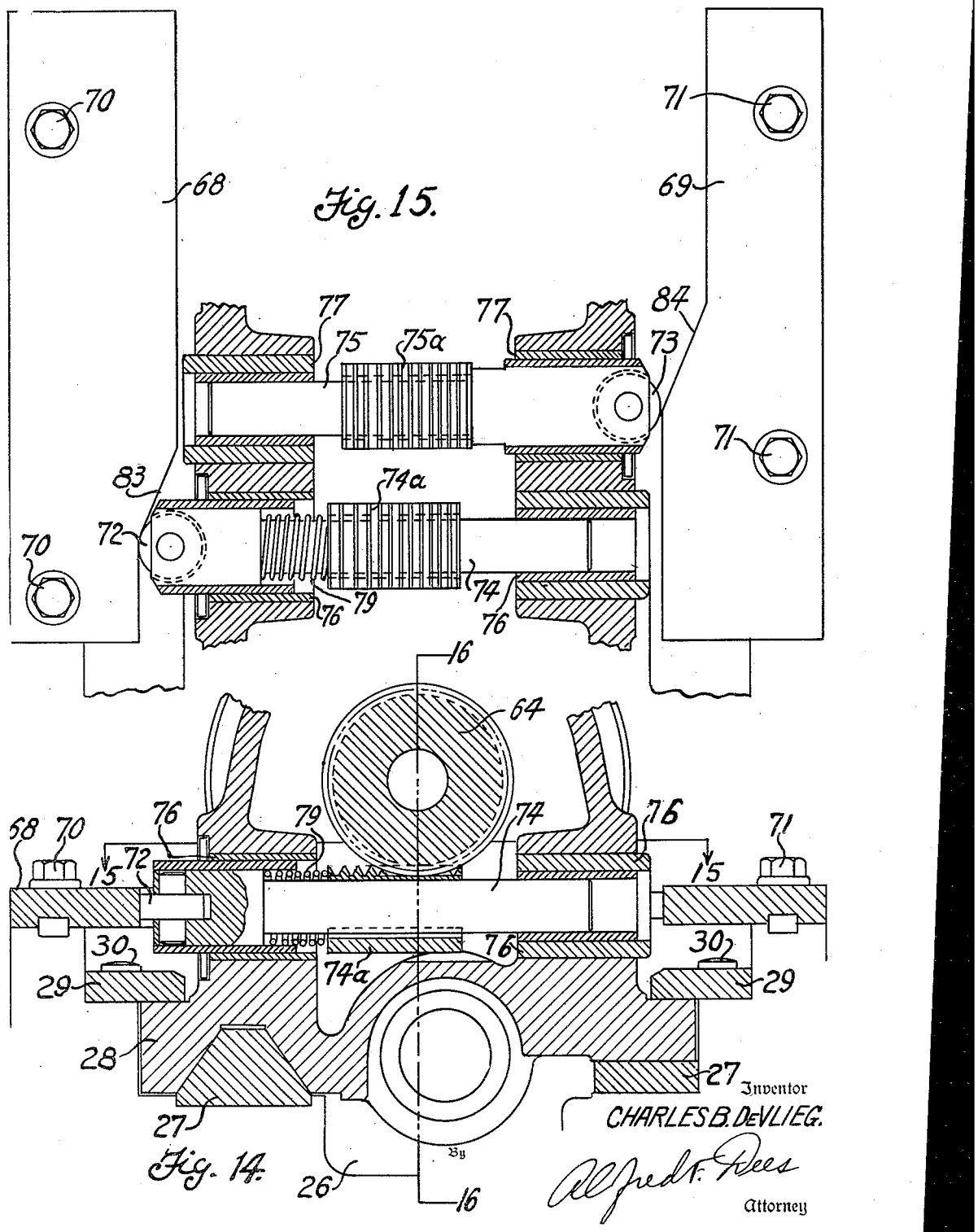
Figure 14 shows a section view taken substantially along the line 14—14 of Figure 11.
Figure 15 is a section view taken substantially along the line 15—15 of Figure 14.

This invention as stated above is particularly concerned with a method of machining and a machine tool for the manufacture of impeller wheels that are used in the construction of superchargers currently employed on various types of modern aircraft engines. Figure 1 shows an impeller wheel having a plurality of impeller vanes 1 integrally associated with a hub 2. The hub 2 is bored as at 3 and said bore is splined over a portion of its length with a plurality of splines 4 interiorly of the said bore 3. These splines are shown in the figure as of a rectangular form but may be made involutes if so desired to produce a more accurately formed work piece. The splines 4, furthermore, bear a definite geometrical relationship to the number of vanes 1, 1.

The individual vanes 1 of the impeller have a plurality of integrated surfaces formed and shaped such that they will handle and move a maximum amount of air for each rotation of the impeller wheel. By referring to Figure 4 it will be observed that the wheel's vanes consist of a plurality of surfaces 5, 6 (which I have termed "plain" surfaces), 7 and 8. Surfaces 5 and 6 are substantially parallel to each other and the longitudinal edges 9 and 10 as well as the top surface 11 taper slightly from one end to the other and one edge to the other. Surfaces 7 and 8 (which I have termed "curved" surfaces) are formed about a radius and merge or become tangent to the surfaces 5 and 6. As the invention becomes better understood it will be noted that the plain and curved portions are characteristic of the cross-sectional shape of each vane substantially at all points in its length, although each front and rear face of each vane is generated from the peripheral edge to the root. The rotative center of the surfaces 7 and 8 is taken about the point 12 which is directly in line with the center of the work holder spindle hereinafter described. According to my invention the front integrated surfaces 5—7 and the rear integrated surfaces 6—8 of each vane are formed to a finished shape by a series of machining operations performed by milling cutters. A separate milling cutter is provided for machining each of the component surfaces 5 and 7 which comprise the front face and likewise a separate milling cutter is provided for machining each of the component surfaces 6 and 8 which comprise the rear face. Each milling operation is performed in succession at a cutting position while the impeller wheel is supported on the work holder. The wheel is indexed on the work holder to successively locate each vane at the cutting position. Each vane is supported at said cutting position accurately and to a high degree of precision both as to location and as to lengthwise compression. In this manner each cutter performs an identical milling operation on each vane in succession from the outer end of the vane to the inner end or root thereof; likewise, the successive milling operations on each vane produce a high degree of accuracy in the finished, integrated surfaces. In the present embodiment of my invention the work holder or fixture is moved rotatively about its spindle center 12 during each lengthwise milling operation, thereby imparting a generated shape to the vane as shown in Figures 1, 2, and 4, as is described more fully. Each vane is accurately and rigidly supported during each such milling operation by the mounting of the wheel blank on a work holder post and by a tail-stock center which is also mounted on the work holder and engages the outer end of each vane at a center point 13. The wheel blank is provided on its periphery with a series of equally spaced centers 13, one for each ultimate vane, as shown in Figure 3. These centers 13 are so located as to give accurate support to each vane at each milling operation and each is preferably in the form of a center point hole adapted to be engaged by a complemental center point 96 carried by the tail-stock and serving to apply the longitudinal compression force above mentioned. The center point 96, being a part of the tail-stock and also a part of the work holding fixture, moves with the work holding fixture when the latter moves rotatively about its spindle center 12. The surface 6 as will be observed from Figure 4 moves from the position at the outer edge of the vane or the periphery thereof to the position 6a at the root or base of the vane where it is blended with the hub 2 of the impeller wheel. The surface 6 lies between the peripheral line of the vane and 6a the root of the vane and is formed by rotating the work piece about the center 12 as the cutter is applied to the vane and is moved from the tip or periphery thereof to the root of the vane. It is obvious therefore that the vane surfaces 5 and 6 which originate at the periphery of the vane and progress to the root thereof are surfaces of revolution and therefore the path of the cutter or forming tool relative to the work piece or impeller vane must therefore likewise be a surface or a path of revolution all about the center 12 indicated in the several figures.

The ends of the impeller vanes are disclosed as having a slightly tapering formation and the enlarged view set forth in Figure 4 shows the work piece as it appears after the final forming operations are imposed on the work piece. The initial step in the forming operation is the placing of a center-point hole 13 on each of the impeller vanes at the periphery thereof. These center-point holes may be suitably formed in the periphery of the wheel blank, being accurately located for the purpose of determining the position of each vane in its progressive coaction with the several milling cutters. This accurate location of the vane portions starts with the initial gashing or roughing operations and continues through the succeeding milling operations until completion of the final or finished operations. After the final milling operations the remaining center hole stock is removed and the peripheral edge of the vane is finished to any desired shape, such as shown in Figure 2. As will be noted hereinafter, a portion of this center hole stock will be removed in the final vane milling operation by reason of the off-center relation of the center 13 to the longitudinal center line at the outer end of the vane as shown in Figure 4. The center hole 13 may be at any suitable point lengthwise along the outer end of the vane but preferably at a medial location so as to provide better balance in the support of the vane.

The several stages of the manufacture of the impeller shown in Figures 1, 2, 3 and 4 from a solid blank forging are set forth in Figures 5, 6, 7, 8, 9 and 10 and comprise two gashing cuts and four different machining and forming operations necessary to form each individual impeller vane.

The first two operations following the formation of the center holes 13 are the gashing cuts in two stages, illustrated in Figures 5 and 6, in which one cut is taken on the trailing side (as shown in Figure 6) and the other cut is taken on the leading side of the impeller vane (as shown in Figure 5). These cuts are taken with a relatively large diametered cutter 14 disposed between two head-stocks 15, 15, or any equivalent structure. In this illustrative embodiment of my invention the milling operation is effected by feed movement relatively between the cutter and the blank in a direction lengthwise of the vane (to be formed) and during this feed movement the blank is given a rotative movement by turning the work holding fixture about its spindle center 12 thereby partially forming the vanes from the solid blank forging. The gashing cut operations leave material as indicated at 16 and 17 defined generally by the dotted lines in Figures 5 and 6 to be removed by subsequent machining operations.

The exact sequence of the next four cutting operations is not material to the practice of the machining method but for simplicity and convenience they will be taken up in the order of the figures as numbered and in actual operation they may be varied in sequence as desired. The operation illustrated in Figure 7 shows the cutting of the vane on the convex or trailing curved side of the vane by a concave cutter 18 mounted in head-stock 19. Cutter 18 has a curvature the same as that of the surface 8 and is driven from one end only on account of its short length. This cut removes the excess metal left following the gashing cut of Figure 6 that is co-extensive with the surface 8.

The next cutting operation is illustrated in Figure 8 in which the excess metal, co-extensive with the surface 7, remaining from the gashing cut of Figure 5 is machined or removed by the use of a convex cutter 20 secured to headstock 21. The curvature of the cutter 20 is identical with the curvature of surface 7. This cutter on account of its short length is driven from one end only and is not supported by a tail-stock.

The trailing surface 6 has the excess metal co-extensive therewith that remains from the gashing cut of Figure 6 and not removed by the cut of Figure 7 removed by the use of a small diametered cutter 22 mounted between two head-stocks 23, 23. This cutter may be driven from both ends in order to prevent distortion or tool breakage on account of its small diameter and to produce a finer finish cut. This operation is shown in Figure 9.

The excess metal left by the gashing cut of Figure 5, co-extensive with surface 5 and not removed by the cut of Figure 8 is removed in the final operation by making use of the cutter 24 illustrated in Figure 10 which is driven by a headstock 25 and supported at its opposite end by dead tail-stock center 25a having a notched portion to permit relative movement or clearance of the curved portion of the vane 1 therewith, and which has provisions for its lubrication which will be more particularly described later in this specification. This cutter 24, as well as the cutter 22, feeds to the bottom or root of the vane and, therefore, is of relatively small diameter. The diameter of each cutter 22 and 24 is determined mainly by the dimension limitation of the adjacent vanes at the root of the vanes. The cutter 24 may, therefore, be of somewhat larger diameter than the cutter 22 because it is not required to avoid interference with the curved portion of the vane shown at the right of Fig. 10. Inasmuch as the end of the cutter 24 remote from the head-stock 25 cannot conform to the curved surface at this side in view of the small diameter of the cutter, I have provided an undercut tail-stock center 25a to give proper support to this end of the cutter. The gashing cutters 14 may be of larger diameter because they do not feed to the bottom or root end.

It is apparent from the foregoing that surfaces 5 and 7 and surfaces 6 and 8 are blended by reason of the fact that the several cuts are tangent to each other. In the performance of each of the cuts of Figures 7–10 inclusive the vane 1 is rotated about the axis 12, as described, which for example produces or generates the curved or integrated surface lying between the periphery of the vane and the root 6a as shown in Figure 4 and which can also be described as a form of generally spiral or helical surface but at any cross-section taken lengthwise of the vane the surface is made up of a generally flat or plain portion 6 and a curved portion 8.

The cutting operations following the gashing cuts are described as single operations but in practice they are broken up into a roughing cut and a finishing cut. This is a conventional practice. The same type of cutters are employed in each instance which are differentiated only by the difference in cut produced. The same rotative movement of the vane about center 12 is produced in both the finishing and roughing cuts. The gashing, roughing and finishing cuts are taken at slow or feed rates of movement during the major portion of the cuts but when operating near the root of the vanes the rate of movement or feed is reduced to a slower feed rate to enable the cutter to clear itself, and when withdrawn from the root of the vane the faster feed rate is again restored. The foregoing process enables the production of the complex surface formation of the impeller vane by the use of more or less conventional cutting tools.

The sequence of the several cutting operations, as previously stated, is optional with the operator and whether a finishing cutter is substituted for a roughing cutter or whether a separate machine is employed for each type of cut or whether only a single machine is employed has no direct bearing on the machining process; the essential fact is that each of the cuts, Figures 7, 8, 9, and 10, illustrated must be taken in the production of the impeller wheel shown. The surfaces produced in each operation on the vane whether in one or a plurality of machines are all taken about 12 as a center and since there is a combined rotative and axial movement of the vane in each and every machine the resulting vane surface is therefore the same in each instance. For some of the steps set forth in Figures 5–10 the mechanism is somewhat altered but the essential operating mechanism of the machine remains the same. For example, when the wheel blank is reversed in its position on the work holder fixture from the position shown in Figures 5 and 25 to that in Figures 6 and 26, the work holder fixture will be of greater thickness and the wheel supporting post will be properly located thereon in order to position the wheel in the operative relation to the cutter shown in Figures 6 and 26; also in the change of speeds and feeds depending on the nature of the cut; also in the angle of the cutters used in Figures 9 and 10 when viewed from the top, since this angle should conform to the bottom of the cut at the root of the vane as shown in Figure 3.

Figure 20:
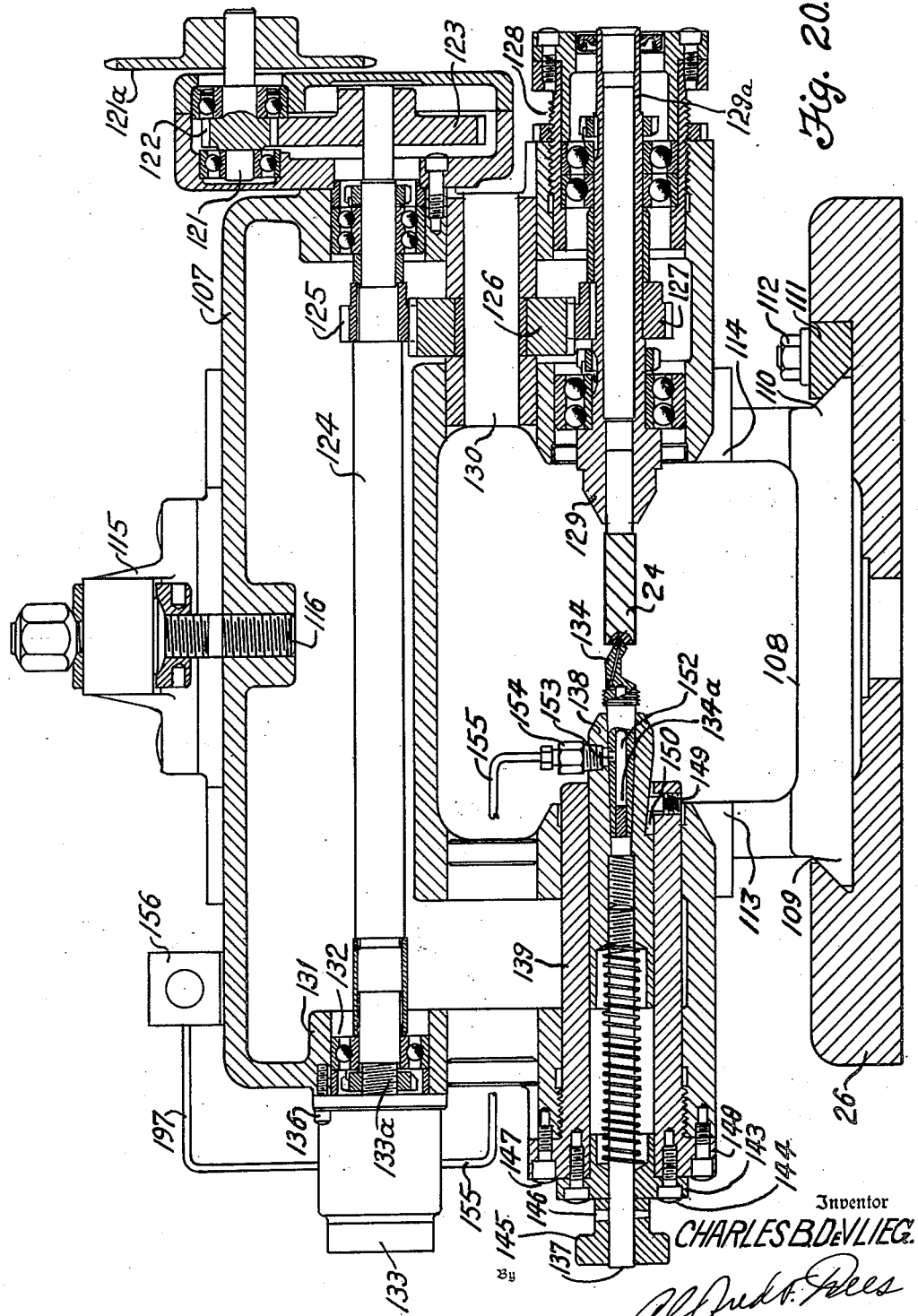
Figure 20 shows a transverse section view taken substantially along the line 20—20 of Figure 19 and showing the lubricated tail-stock.
Figure 21:
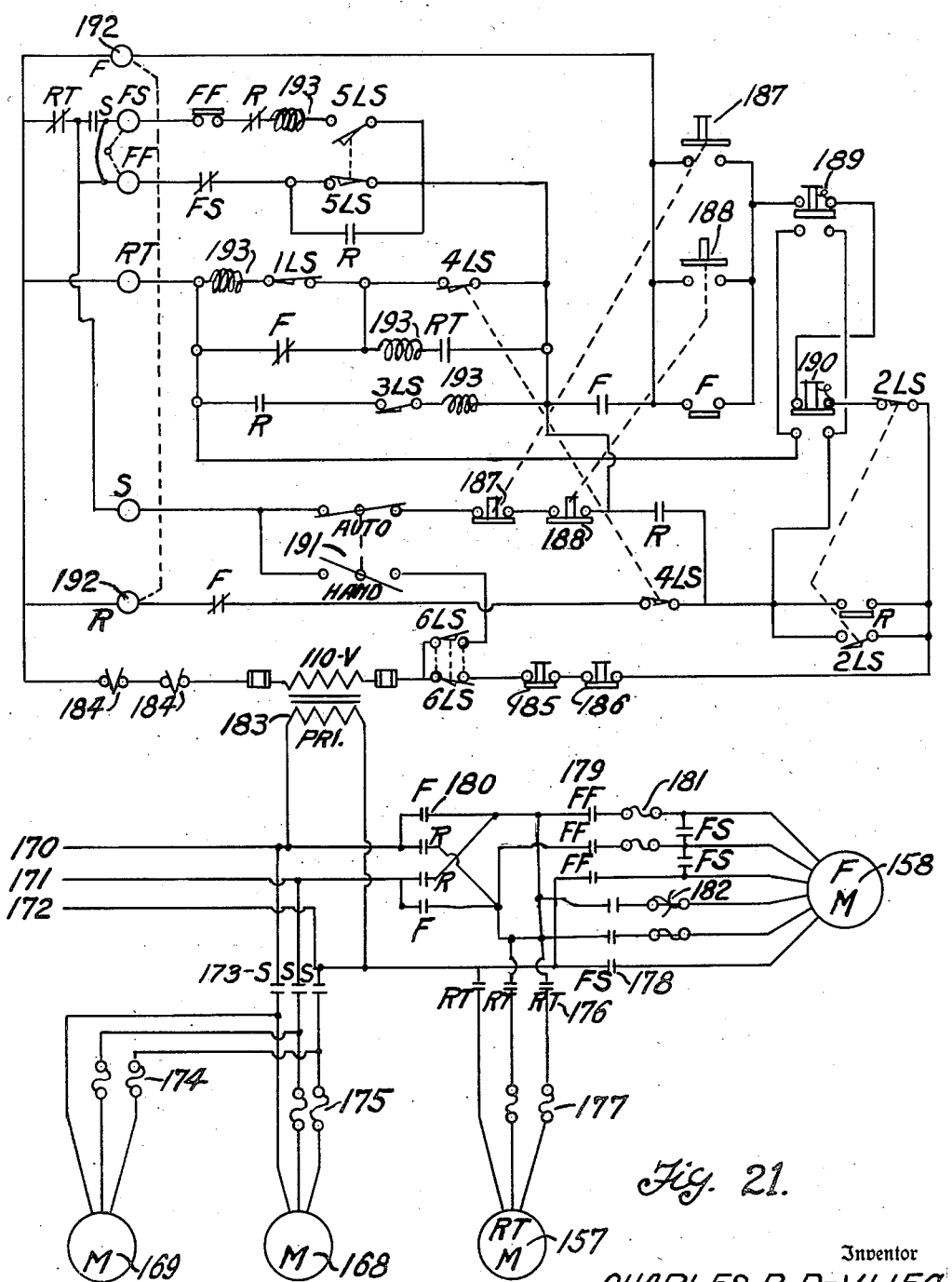
Figure 21 shows the single line wiring diagram of the mechanism employed on the machine tool.

The operations just described are performed on a machine structure set forth in Figures 11–20 and in a control and circuit therefore as particularly set forth in Figure 21. An appropriate base 26 is provided which may be of any suitable shape to support a work holder and a cutter for relative movement as well as the prime movers for each, a coolant sump and an oil and coolant pump. The base element 26 is equipped with a pair of ways 27, 27 securely fixed therein by any suitable means well known to the art. Disposed upon the ways 27, 27 for sliding motion relative of the base 26 is a work spindle housing 28 that is retained on the ways by means of a pair of gibs 29, 29 removably secured to the base 26 by means of a plurality of screws 30, 30.

Work spindle housing 28 is reciprocated upon the ways 27, 27 by means of a lead screw 31 that is threadably received in a pair of nut elements 32, 32 held in a bored extension or housing 33 integral with the housing 28. These nut elements are rotatable relatively of each other and the housing 28 for the purpose of taking up slack or back lash and are held in adjusted position by means of the screw 34.

The screw 31 extends into a subsidiary housing 35 secured to the base element 26 by means of a plurality of screws 36, 36 which has a cover element 37 secured thereto by means of screws 38 and which has a second housing 39 secured to the cover 37 by means of a plurality of screws 40 each of which is threaded into the housing 26 and act to secure the housing 35 and cover 37 in addition to the other screws set forth above. The screw 31 extends into and through each of the several housings described and is provided with a squared portion 31a to which an appropriate hand crank may be attached whereby to rotate screw 31 manually such that manual and trip adjustments may be facilitated.

The screw 31 is supported in the element 37 by means of a plain bearing 41 which lies between two thrust bearings 42, 42 held in position by retaining means 42a to take up the end thrust caused by the lead screw 31 moving the housing 28 relative to the base 26. A gear 43 is fixed to the screw 31 and meshes with a second gear 44 rotatably mounted on a shaft 45. Gear 44 is equipped with a spring actuated brake device adapted to prevent overrun of the work during rapid traverse approach of the work to the cutter. Gear 44 engages gear 47 rigidly mounted on a shaft 48 rotatably supported in appropriate bearings 49, 49 one of the latter mounted in a removable housing 50 secured by screw 50a to the base element 26.

Mounted on shaft 48 is a worm wheel 51 rotatably supported in appropriate radial bearings 52, 52. The worm wheel engages a worm 53 that derives its motive power from an appropriate two speed feed motor hereinafter set forth. The shaft 48 further rotatably supports a gear element 54 which is driven by a rapid traverse motor hereinafter more particularly set forth.

The shaft 48 is provided with a clutch element 56 slidable with respect to the shaft 48 but keyed to it to rotate shaft 48 at either feed or traverse rates. Clutch element 56 is adapted to directly engage gear 51 or gear 54 through the medium of a sleeve element 57; each of the elements have clutch teeth therein to effect engagement to transmit rotative motion from the motors just described to the shaft 48. A sleeve 48a prevents movement of shaft 48 relative to base 26 and housing 50. The clutch elements are manually shifted by means of a lever element 55 that is fixed to a shaft mounting a bell crank 59 that acts to shift or move clutch shifter 60. The lever 55 (Figure 12) is provided with a handle 61 a portion of which is slidable relative to the other such that detent 62 thereof may be permitted to engage in apertures 63, only one of which is shown, to hold the lever in any manually selected position. For automatic operation an appropriate magnetic shift 193 is operatively linked with shifter 60 to shift clutch 56 while a tongue and groove means well known to the art is provided to keep handle 61 permanently disengaged from the detent openings during automatic operation.

The housing 28 mounted on ways 27 is reciprocated therealong by the transmission mechanism just described. The ways 27, 27 are constructed as shown in Figure 17 which in co-operation with the gibs 29, 29 keep the motion of housing 28 in a straight line and uniform plane and prevent any possible twisting of the housing 28 relative to the base 26. The housing 28 rotatably supports a spindle 64 by means of radial and thrust bearings 65, 65 which are of the anti-friction type as more particularly shown in Figure 16. A cap element 66 is removably secured to the end of the housing 28 and covers a separable collar element 67 that engages one of the raceways of bearing 65 and prevents any axial motion of the spindle 64 relative to housing 28. The opposite end of the spindle 28 is shouldered and engages one of the raceways of the bearing 65 disposed in the right hand end of the housing thereby preventing axial motion of spindle 64 relative to the housing 28. It is apparent therefore that the shouldered right hand end of the spindle and the collar 67 keep the spindle in position. Suitable lubricant retainers are provided and when it is desired to remove the spindle 64 from the housing the cap 66 and collar 67 are removed which then permits the axial separation of spindle 64 and housing 28.

The spindle 64 is adapted to be rotated by the movement of the housing 28 as it is reciprocated along the ways 27, 27. The rotary motion of the spindle 64 is governed by and originated with a pair of complementary profiled cams 68 and 69 secured to the base 26 by means of a plurality of screws 70 and 71. Each of the cams 68 and 69 is engaged by follower rollers 72 and 73 that are reciprocably mounted in the housing 28. The follower rollers 72 and 73 are in the form of rollers rotatably supported in shaft elements 74 and 75. The shafts 74 and 75 are reciprocably mounted in appropriate bushings 76 and 77 disposed upon opposite sides of the housing 28 and permit the free and easy sliding of the shafts relative to said housing 28. Fixed to each of the shafts 74 and 75 are gear elements 74a and 75a. Each of these gears is adapted to engage a toothed portion 78 on spindle 64 which comprises a gear element thereon. Spring 79 is interposed between the gear 74a and the roller end of the shaft 74 to take up any slack or back lash that may exist between gears 74a and 75a and the toothed portion 78 of the spindle 64. The gear 74a must therefore slide relatively to shaft 74 but is keyed thereto by key 81 to effect the necessary rotary motion of the spindle 64. Gear 75a is rigidly keyed to shaft 75 by key 82.

The operation of the device therefore is dependent upon the reciprocation of the housing 28 in co-operation with the cams 68 and 69. Therefore when housing 28 has reciprocated to the point where the rollers 72 and 73 engage the profiled portions 83 and 84 of the cams the plungers or shafts 74 and 75 will be reciprocated in their bearings 76 and 77 and will cause the spindle 64 to be rotated as a result of the reciprocal motion of the housing 28. The degree of rotation, as well as the rate, of the spindle 64 is controllable by varying the steepness of the profiled surfaces 83 and 84. The steepness of the profile therefore will determine the curvature of the individual vanes of the impeller wheel that is mounted in a fixture secured to the spindle 64 to be subsequently described in greater detail.

The spindle 64 has secured thereto a work holding fixture 85 in form of an extended member 86 and having a flange element 85b adapted to fit the end of spindle 64 and secured to the spindle by means of a clamp collar element 85a. The work holding fixture 85 mounts a work supporting post 87 and a tail-stock designated generally by 94 each of which structures is more specifically set forth elsewhere in the specification.

The work post 87 that holds the impeller wheel hub 2 comprises a bolt element rigidly held in the work-holding fixture 85. The bolt has a head 89 seated in an appropriate aperture and held in the fixture by screws 90, only one of which is shown.

The post comprises an enlarged portion 88 which is of the same diameter as the splined aperture of the impeller wheel. Immediately above the enlarged portion the post is splined as at 91 and above this portion the post 87 is threaded. A splined ring or washer 92 is co-operatively associated with the splined portion 91 of post 87 and engages the work piece or impeller wheel on its one face and its opposite face is provided with a concave surface that co-operatively receives the convex portion of a nut 93. When a work piece or impeller wheel has been assembled thereon the splined portion of post 87 and splined washer element 92 will prevent any possible turning or twisting of the impeller wheel when it is locked in position by the nut 93 threaded onto post 87. Any turning of nut 93 will under no circumstances disturb the setting of the work piece onto the fixture 85 which is always in a predetermined position and in order to insure the maximum accuracy of the impeller wheel in its finished state it is absolutely essential that it be accurately positioned and held. The splined washer 92 and the splined portion 91 of the post 87 positively prevents such displacement and the convex and concave portions of washer 92 and nut 93 definitely assure that any pressure applied by the nut 93 will always be in the axial direction of post 87. This also avoids distortion of the impeller wheel when the nut is clamped.

Another factor in the determination of the accuracy of the finished product in the impeller wheel is that the tail-stock element 94 be uniformly and unvaryingly applied to each of the impeller vanes 1. It has been previously asserted that prior to the cutting operations the impeller wheel is very accurately provided with an index center hole 13 for each individual blade. In order to secure a uniform and unvarying pressure of the tail-stock on each of the individual vanes at these index centers of the impeller wheel it is essential that some mechanism be provided whereby irrespective of the relative strength or degree of carefulness of any one of a number of operators that a calibrated force be applied to the centers 13 on each of the impeller vanes such that if there is any distortion of the vane by reason of the tail-stock that it will be exactly the same in each and every successive operation. To this end work holding fixture 85 is provided with a tail-stock 94 for supporting the free end of each impeller vane with exactly the same amount of compressive force by reason of the tail-stock construction and this construction comprises a reciprocable element 95 which has a tail-stock center point 96 that engages or is engageable with the index center hole 13. Element 95 is slidable in appropriate slots formed in the outer end of work holding fixture 85, and is further adapted to be held therein in a locked position. Mounted on the end of the work holder 85 is a cover or cap element 97 that is appropriately apertured interiorly thereof as more particularly shown in Figure 17. Element 95 has a sleeve or extension 98 associated therewith which is likewise apertured and which lies on the same axis as the aperture in cover 97. The cover 97 may be removably secured to the end of housing or work holding fixture 85 by means of a plurality of screws (not shown). A spring 99 is inserted in the apertures just described and its one end engages the cover 97 and its other end engages or acts against the element 95. Spring 99 is calibrated and exerts a definite force predetermined by the operator and by the character of the work as well as the size thereof. These springs are designed to apply a force for the type of impeller wheel illustrated of about 60 pounds per inch. In any event where the character of the work piece requires changes of force to be applied this is accomplished by removing the said plurality of screws and then substituting a differently calibrated spring. The force of the spring is uniformly applied to the work piece and removed therefrom by means of an operating bolt 100 that is provided with a head 101 at its one end and is threaded at its other end. Bolt 100 is rotatably received in a bearing sleeve element 102 and at the other end the bolt passes thru a specially formed clamping plate 103 that is engaged at one end against the work holding fixture 85 and at its other end engages with the element 95. Substantially midway of the length of the bolt it is provided with a cam 104 that is adapted to be rotated in a slot 105 formed in the element 95. The slot 105 is substantially of the same length axially thereof, that is axially of the longitudinal direction of the element 95 as that of the diameter of bolt 100 plus the greatest length of the cam 104. Bolt 100 at its other end is provided with a nut 106 that engages with plate 103, the nut 106 being convex at its one end to engage a complementary concave portion of locking plate 103. A spring 80 may be provided on the bolt in the position shown.

When it is desired to apply the tail-stock center point 96 to the index center 13 of the work piece or vane 1 or to withdraw the tail-stock point therefrom a wrench is applied to the head 101 in order to rotate bolt 100 and its cam 104. Upon rotation of the bolt 100 cam 104 will engage the right hand vertical wall of the slot 105 formed in element 95 and urge it to the right thereby withdrawing the center point 96 from index center hole 13. The bolt 100 when rotated 180° will have completely withdrawn the point 96 and will then make possible the index moving of the work piece to the next vane and a repeating of the cutting operation. When bolt 100 has been rotated to the position indicated in Figure 17 spring 99 will then be the only agency that is applying force to the work piece and since this is a calibrated spring it is evident that it and it alone will determine the force to be applied to the tail-stock element and its point 96 on the vanes 1 of the impeller wheel. Nut 106 may then be turned home which will cause clamping plate 103 to lock element 95 in position and thereby assure an unvarying compressive stress in the longitudinal direction of each individual vane 1 of the impeller wheel. It is therefore evident from the foregoing that the compressive force on the workpiece by reason of the foregoing will be constant and unvarying irrespective of the machine on which it is used, the cutting operation or the operator setting up the work piece in the world holder.

The cutter head employed in the several operations is particularly set forth in Figures 19 and 20. The basic structure of this head is employed in all cutting operations and is varied to suit the particular operation. Figure 20 uses a dead center and a live center and represents the device for operation of Figure 10. The operations of Figures 5, 6, and 9 use the device with two live centers and the operations of Figures 7 and 8 use only that part of the device driving one live center. The device is flexibly designed to quickly change from one operation to the other.

The cutter head 107 is supported for both vertical and lateral adjustment on the base 26 of the machine and to that end the base 26 has a way formed therein for receiving the cutter head supporting frame 108. The frame 108 is equipped with triangular way elements 109 and 110 the former of which co-operates with a complementary element or gib formed in the base 26 and on the opposite side way 110 is held by a 26 and on the opposite side way 110 is held by a removable gib 111 to hold frame 108 in the frame 26. A plurality of bolts or screws 112 only one of which is shown hold gib 111 in position. The head 107 and the frame 108 are equipped with appropriate complementary ways 113 and 114 for adjusting the head 107 vertically and mechanism 115 fixed to frame 108 is provided with a screw 116 threaded into frame 107 to effect the vertical movement. The latter mechanism is of a conventional character well known to the art. The frame 108 is moved on the base 26 by means of an adjusting screw mechanism 117 fixed into the frame 108 and co-operating with head 118, adjusting nut 119 and locking nut 120. This likewise is conventional structure.

Power is applied to the cutter head from an appropriate motor 169 hinged to frame 108 and shown in dotted lines and in tilted position away from the cutter head for clarity and belt or chain connected to a power receiving element 121a on shaft 121 rotatably supported in housing 107 that has a gear 122 fixed thereto meshing with a gear 123 fixed to a shaft 124 rotatably supported in the housing. A gear 125 is fixed to shaft 124 and meshes with a gear 126 supported on idler shaft 130 and then meshes with a gear 127 secured to the shaft mounting a spindle nose 129. The spindle nose shaft 129a is axially adjustable in the housing 107 by means of a mechanism 128 which is of a more or less conventional character. Each of the shafts are supported for rotation in appropriate bearings of the anti-friction variety.

Shaft 124 is continued to the left as illustrated in Figure 20 and is supported for rotation in a boss 131 that receives a bearing 132 and then connects to the rotor shaft 133a of an oil pump 133 supplying lubricant to the dead tail-stock 134. Oil pump 133 is secured to the cutter head 107 by means of a plurality of screws 136, only one of which is indicated in Figure 20.

Tail-stock 134 is arranged on a stem or shank that is rigidly received in a sleeve element 138 slidably mounted in a second sleeve element 139 which is rigidly supported in the cutter head 107. Rod 137 threaded into 138 is extended to the left and protrudes beyond the end of the housing 107 where it is slidably received in a bored closure element 143 secured to the sleeve bearing 139. A plurality of screws 144 secures closure 143 to the sleeve bearing 139. A handle grip 145 is received over the end of the rod 137 that protrudes beyond the closure 143 and is secured on the rod 137 by wedge element 146. Withdrawal of the wedge element 146 permits the removal of the closure element and allows the withdrawal of the entire tail-stock and stem structure. The shank of the tail-stock is slightly tapered and is received in a correspondingly tapered bore of 138 to insure an absolutely tight fit. The bore 152 in the shank of 134 is plugged as shown by element 134a.

The sleeve element 139 is threadably received in the head 107 and a plurality of screws 147 are adapted to lock the flange 148 of sleeve bearing 139 to the head and thereby prevent any axial or accidental removal of the entire unit from the cutter head 107. Means have been further provided in the form of a screw 149 that has a slanted stem element thereon adapted to engage with a slot or groove 150 tapered at its base, and in which groove 150 the stem of screw 149 fits. Groove 150 is closed at its one end and the function of this groove is to prevent any rotational movement of sleeve 138 relative to sleeve 139 as well as to limit the axial movement of sleeve 138 to the left.

Concentrically disposed on the rod 137 secured to the shank of the tail-stock 134 is a spring 151 which abuts a counter-bored end of the sleeve 138 at its one end and abuts a counterbore of closure 143 at its other end. The function of this spring 151 is to urge tail-stock 134 into engagement with the cutter 24 and to supply a more or less unvarying force thereto. Attention is at this point invited to the fact that upon removal of sleeve 139 as a unit from the head 107 it may be replaced by a head-stock or spindle nose similar to 129 such as must be employed in the operation of a tool illustrated in connection with the operations of Figures 5, 6, 7 and 9 or with tool 24 as in the operation of Figure 10. In either event shaft 124 is connected to appropriate mechanism similar to parts 125, 126, 127, 128, 129 and 130 such that the speed of the parts is exactly the same when two live spindles are employed for the operation requiring them. When that is done all mechanism on the left of the view in Figure 20 is removed.

The cutter used in Figure 8 by reason of its relatively small diameter operates at a rather high rate of speed and the coolant that normally is applied to the cutter and work piece will not be helpful in keeping the contact surface between tail-stock 134 and the cutter in a cool state and in order to prevent the generation of heat at this point some form of lubrication must be applied thereto in order to minimize the generation of heat. The tail-stock shank has a bore 152 most of its length and is provided with a cross bore 153 that is operatively associated with the coupling 154 screwed into an aperture formed in sleeve element 138 and which is concentric to cross bore 153 during normal operation of the machine. Conduit 155 leads to the exhaust of pump 133 and directly to coupling 154. Oil exhausted from pump 133 passes through conduit 155 through bore 153 and thence through the bore concentric with the shank of tail-stock 134 and sleeve 138 and then exhausts between the contact surfaces of tail-stock 134 and the cutter 24. The tail-stock is appropriately bored as shown to permit passage of lubricant. Oil pump 133 operates at a comparatively high pressure and therefore assures a positive flow of lubrication to the points of contact of the cutter and tail-stock. Attention is invited at this point to the fact that screw 149 and slot 150 co-operate further to prevent the rotation of sleeve 138 in bearing sleeve 139 to prevent any possible breakage or checking of oil flow in conduit 155. The aforesaid structure provides an efficient and positive means to prevent frictional heating of the cutter by the tail-stock 134.

Coolant or cutting oil which in the instant application is a lubricating oil bearing mixture is retained in a sump 194 arranged in the base 26 of the machine. Pressure pump 195, driven by motor 168, withdraws fluid from the sump and exhausts part of it directly onto the cutter through conduit 196. Conduit 197 takes off from conduit 196 and enters a filter 156 and then pressure pump 133 exhausts it from the filter and by means of conduit 155 leads it to the tail-stock 134 when cutter 24 used in the operation of Figure 10 is performed. A by-pass relief valve 198 exhausts excess lubricant or fluid from the conduit 155 to conduit 196. It will be understood that in all other operations except that of Figure 10 the pressure pump 133 may be eliminated.

The transmission for effecting the relative motion of work holder spindle housing 28 and its associated work holding fixture 85 relative to the cutter head 107 and the cutter rotatably supported therein originates in two motors 157 and 158 one of which 157 is a rapid traverse motor and the other 158 is a feed traverse motor. Motor 157 is of a conventional single reversible speed type and is adapted to reciprocate housing 28 at a rapid traverse rate in either direction of travel. Motor 158 which drives the housing 28 at feed rates, is of the two speed reversible variety in which the one speed is approximately one half that of the other speed and serves to move the housing 28 at a fast feed rate and at a slow feed rate. The essential reason for the slow feed rate is to enable the cutter, while it is working at the root of each of the vanes of the impeller wheel, to clear itself and to prevent any possible overloading of the relatively small diametered cutters.

Motor 158 is power connected to the worm wheel 53 and motor 157 is power connected to the gear or sprocket 54 and thence through the selector mechanism 56 previously described.

The casing 28 in which the spindle 64 is mounted has appropriately arranged thereon as shown in Figure 11 a plurality of trip dogs 159, 160, 161, and 162. These trip dogs, in vertically spaced planes, are of a conventional character and are adapted to actuate trip mechanism in housing 163 which housing supports mechanism that actuates switches to be hereinafter described. One of the dogs is also adapted to actuate a selector mechanism to thereby connect either of motors 157 or 158 to the feed screw 38. Housing 163 contains two sets of trip mechanisms 164 and 165, one beneath the other (only the upper set being shown), which control the reversals and the rate selection for the transmission in any well known manner.

It was pointed out above that lead screw 31 is rotatably supported in housing 35 associated with base 26. Lead screw 31 is extended beyond housing 45 and is provided with a squared end 31a to which a crank may be applied for manually adjusting or moving the housing 28 as previously described. Crank end 31a is normally kept covered by housing 166 which is pivotally secured to housing 39. A switch 167 is adapted to be opened and closed by housing cover 166 and when 166 is in an elevated position switch 167 is open thereby opening the circuits to feed motors 158 and traverse motor 157 but it is still possible to rotate and apply power to cutter spindle motor 169 and coolant pump motor 168. The crank is employed at such times as in setting up the machine and in temporarily relieving a cutter or for such operations as the operator may deem necessary.

Figure 21 sets forth a single line wiring diagram to show the operative relationship and essential controls necessary to effect the operation of the machine. The circuit is illustrated as a power circuit and as a control circuit in order to simplify the understanding and organization of the elements thereof. Motors 157, 158, 168 and 169 are schematically represented and each is connected to incoming lines 170, 171 and 172 through plurality of controls. Motors 168 and 169 both of which are constant speed non-reversible motors are connected to the lines by means of contactors 173 (S, S, S), and each is provided with overload protection 174 and 175 which may be in the form of a fuse as illustrated or may be in the form of an overload relay if desired. Rapid traverse motor 157 is connected across lines 170, 171 and 172 but is adapted to be reversibly connected thereto and is likewise provided with contactors 176 (RT, RT, RT) and overload protection 177 which is in the form of a fuse as illustrated. The two speed feed motor is connected to the incoming lines through two sets of contactors 178 and 179 and likewise is reversibly connected to the lines 170, 171, and 172 and is provided with two sets of overload devices as illustrated. A set of master contractors 180 (F, F, R, R) are arranged in the circuit such that they control the stoppage of motors 157 and 158 whereas contactors 176, 178 and 179 control the rapid traverse motor and the fast feeds and slow feeds respectively of feed motor 158.

Each of the contactors 178 and 179 is followed by an overload protection 181 and 182 illustrated as fuses to provide the overload protection for the two speed feed motor 158.

The control circuit for the several contactors is energized through a transformer 183. The master overload protection is provided by means 184 and serves to protect the entire circuit. Switches 185 and 186 are stop push buttons and since there are two shown they are adapted to be placed in two separate operating stations. There are two start buttons or switches 187 and 188 by which a cycle of operation of the machine is initiated and may be located at two different stations such that the cycle may be controlled from two differently located places on the machine. 189 and 190 indicate two return push button switches which enable the operator to reverse the relative movement of cutter and work piece at any point in the cycle of operations. 191 is a master selector switch with which a manual or an automatic cycle for the machine may be selected. The foregoing list the essential circuit items for the starting and stopping and automatic or manual control for the cycles of operation.

The circuit is equipped with a plurality of limit switches that control the starting and stopping of motors 157 and 158 and as to motor 158 act to select the fast feed or the slow feed to be applied by that motor to the lead screw 31 and to the housing 28. 192 illustrates the starting coils for the motors 157 and 158 and the symbol 6LS is the same as switch 167 shown in Figure 12. The various circles that are illustrated in the single line diagram represent contactors in the motor circuits. In order to assist in the understanding of the circuit those contactors in the control portion of the circuit that are designated FF, FS, F and R represent the contactors that control the fast feed, slow feed, forward and reverse movement respectively of the motors 157 and 158.

The operation of the machine which is illustrated in Figures 11–15 which is adapted to carry out the several steps in the process of manufacture of the impeller wheel vanes and the initiation of any cycle of movement for any of the steps outlined in Figures 5–10 inclusive constitutes a selection of the proper operating cycle by the operator in the choice of automatic or manual operations by the setting of switch 191. Initially the operator takes a forging which has been properly indexed by forming therein index center holes 13 and mounts the work piece on the post 87 mounted on work holder fixture 85 and locks 87 thereon by means of the mechanism described in connection with Figure 17. He then places the tail-stock center point 96 into the index center hole 13 and locks the tail-stock center in position by mechanism previously described. Having selected a manual or automatic cycle of operations the operator depresses one of the cycle start buttons 188 or 187 which energizes a forward contactor F and the rapid traverse motor is started when contactors 176 are closed by the cycle start switch that has been depressed and simultaneously 193 shifts clutch 56 to the right in Figure 13. The work holder is then moved toward the cutter at a rapid traverse rate until one of the dogs 161 on the housing 28 disengages the switch 4LS and 193 shifts clutch 56 to the left in Figure 13. Simultaneously switch 1LS is engaged or closed and that opens contactors 176 and stops rapid traverse motor 157. Motor starting coil S is then energized closing contactors 173 and starting spindle motor 169 and coolant pump motor 168. Simultaneously high speed contactor FF 179 is energized which causes feed motor 158 to rotate at its highest speed and causes the work holder to travel at a fast feed rate. At the final limit of the forward motion 2LS is engaged that deenergizes coil S and stops the feed motor and actuating reversing contactor R of 180. This action is initiated by trip dog 159. FF (179) and S are then re-energized and a reverse feeding motion of the work support is initiated. This continues until another one of the trip dogs 162 engages 3LS which energizes the rapid traverse motor 157 reversely energizing 195 to shift 56 to the right by closing contactors 176 and which simultaneously de-energizes coil S and contactors FF 179. The rapid traverse motor then reversely moves housing 28 until a suitable limit switch actuated by movement of the housing 28 causes the cycle of operations to be terminated.

It was pointed out above that it is desirable in many instances that the forward and reverse feed movements be broken up into a fast feed and a slow feed the latter for the purpose of permitting the cutter to clear itself and to avoid damage thereto in the event of overload of any kind. The slow feed movement is introduced into the above cycle by an additional cam or dog 160 which causes 5LS to be engaged after the initiation of the fast feed movement of dog 161. 5LS de-energizes the contactors FF of 180 and energizes contactors FS and thereby enables the slow feeding of the work piece into the cutter. The slow feed motion is terminated by the dog 159 which reverses the rotation of the slow feed and continues until 160 again de-energizes the slow feed of motor 158 and initiates the fast feed of the motor as has been previously described. Thereafter the fast feed is converted to a rapid traverse by trip dog 162 until the cycle is stopped by a suitable limit switch as above mentioned.

Trip dog 160 constantly engages 5LS and therefore does not release it until the point of travel is reached in which the two are no longer in contact. The dogs 159, 160, 161, and 162, as well as the sets of trip elements 164 and 165, are shown diagrammatically; and it will be understood that in practice these will be of proper shape and relative arrangement to perform the intended control functions.

At any point in the cycle of operations return switches 189 or 190 may be depressed and depending upon whether the feed motor is operating or the rapid traverse motor the said switches energize the reverse coils and contactors of either of the motors and continue the reverse motion until 4LS is re-engaged and thereby stopping the relative motion of cutter and work holder.

When switch 191 is set to automatic operation trip dog 162 functions the same as starting switch 187 or switch 188 and causes a continuous operation of the relative motion of cutter and work holder.

At any point in the operation of the cycle of operations stop switches 185 or 186 may be depressed bringing to rest the relative motion of the cutter and the work holder. When any one of the start switches 187 and 188 is again depressed it will initiate a forward motion but at a feed rate instead of a rapid traverse rate. The depressing of a return switch 189 or 190 will initiate the movements described in the preceding paragraph. Tripping of any of the overload releases or a failure of current will cause the circuit to function the same as if a stop button had been pressed. Switches 184 and 184 are master overloads and can effect the stopping of the circuit.

It was pointed out above that when cover housing 166 is lifted or removed the limit switch 6LS or 167 will be disengaged and this de-energizes the entire control system except that control by one of the selector switches which permits the operation of the spindle motor 169 and the coolant pump motor 168. This arrangement prevents any possible conflict of movement between an attempted hand setting of the work holder or housing 28 and the operation of the motors 157 or 158.

That which is considered new, novel and useful and that which is desired to be protected by Letters Patent of the United States is as follows:

1. In a method of manufacturing an impeller wheel from a circular blank to provide a plurality of closely positioned vanes emanating from a hub, each vane having its front and rear faces each composed in cross-section substantially at all points in its length of a curved portion and a plain portion tangential to the curved portion, which comprises: cutting the forward and rear curved portions of the vane with separate form milling cutters and rotating the blank as it is being cut to generate the milled surface lengthwise of the vane, and then cutting the forward and rear plain portions of the vane with additional milling cutters each of cylindrical form and simultaneously rotating the blank as it is being cut to generate the milled surface lengthwise of the vane and to integrate the finished milled surfaces.

2. In a method of manufacturing an impeller wheel having a plurality of closely positioned vanes thereon, each vane having front and rear faces with each face composed in cross-section substantially at all points in its length of a curved portion and a plain portion tangential thereto, which comprises: mounting the impeller wheel in a work holder which is rotative about a given axis and which has a work post substantially at right angles to said axis, on which work post the impeller wheel is adapted to be indexed to locate its individual vanes at a cutting position, the work holder having a tail-stock center point for supporting the outer end of each vane at its indexed cutting position, each vane at the cutting position extending in a plane substantially parallel with said axis; presenting the vane to a concave cutter and forming one of the curved sides thereof by feed lengthwise of the vane and simultaneously rotating the vane about said axis; then presenting the vane to a cylindrical cutter and forming a plain surface of the vane by feed lengthwise thereof and simultaneously rotating the vane about said axis; then presenting the other side of the vane to a convex cutter and forming the curved side thereof by feed lengthwise thereof and simultaneously rotating the vane about said axis; and then presenting the vane to a cylindrical cutter and forming the other plain surface by feed lengthwise of the vane while simultaneously rotating the vane about said axis.

3. In a method of manufacturing an impeller wheel having a plurality of closely positioned vanes thereon, each vane having front and rear faces with each face composed in cross-section substantially at all points in its length of a curved portion and a portion tangential thereto, mounting the impeller wheel on a work holding fixture which is rotative about a given axis, indexing the impeller wheel on a work post which is carried on the work holder substantially at right angles to said axis, and by each indexing step presenting an individual vane at a cutting position; holding each vane at said cutting position against displacement and under a constant lengthwise compressive force applied by a tail-stock supporting the free end of said vane; then presenting the vane to a concave cutter to form one of the curved surfaces; then presenting the vane to a convex cutter to form the other curved surface; then presenting the vane to a cylindrical cutter and forming one of the sides; then presenting the vane to a different cylindrical cutter to form the other side; said vane being held under said compressive force and rotating on said axis as it is advanced lengthwise into each of said cutters.

4. In a machining method for forming the vanes of an impeller wheel; mounting said wheel in a rotatable work holder and in a plane such that the vanes thereof will rotate in succession on a center coincident with the center of rotation of the work holder; then applying a constant pressure spring tensioned tail-stock centering device to the vane lengthwise thereof when rotated; then presenting the vane to a plurality of cutters in succession and simultaneously rotating the work piece as it is moved into cutting engagement with said cutter; said cutters forming a plurality of trailing and leading integrated curved and plane surfaces on said impeller vane.

5. In a machining method for forming the surfaces of the vanes of an impeller wheel; mounting an impeller wheel in a work-holder that is movable relatively to a cutter and simultaneously rotating the work holder such that each vane thereof when presented to the cutter lies in a horizontally disposed plane; said work holder rotating as it moves relative to the cutter and on a horizontal axis substantially parallel with the plane of said vane; successively presenting the said vane to a concave cutter, a convex cutter, a plain cutter and a different plain cutter to form the front and trailing surfaces of the vane; and said surfaces being surfaces of revolution.

6. In a method of machining an impeller wheel blade which comprises; moving a blade of the impeller wheel relatively of a cutter a plurality of times and simultaneously rotating the blade on a fixed axis substantially parallel with the length of the vane; a first relative motion forming one of the curved surfaces with a concave cutter; a second relative motion forming one of the plain surfaces with a plain cutter; then a third relative motion forming another curved surface with a convex cutter and a fourth relative motion forming a different plain surface with a different plain cutter; each of said surfaces being blended and integrated with its complementary surface.

7. In a machining method for the vanes of an impeller wheel which comprises; mounting an impeller wheel in a work holder and supporting a vane thereof in a substantially horizontal position and under a constant and unvarying stress; laterally moving and rotating said vane on its own axis and on the axis of the work holder as it is presented to a plurality of successive formed cutters, one being a double end driven cylindrical cutter; one a concave cutter; one a cylindrical cutter and one a convex or elliptical cutter and said combined lateral and rotative movements blending the several complemental surfaces formed by the several cutters.

8. In a method of forming an impeller wheel from a cylindrical blank, which comprises; mounting the blank at an acute angle to the cutter; then performing a plurality of gashing cuts in the blank to rough form impeller vanes while simultaneously rotating the blank on a fixed axis presenting each of said vanes to a concave cutter to form the trailing curved side of the vanes; then presenting each of the vanes to a convex cutter to form the leading curved side of the vanes; then presenting each of the vanes to a first plain cutter to form the trailing surface and presenting the vanes to a different plain cutter to form the leading surface; said vanes being rotated about said fixed axis during each cut.

9. In a method for forming an impeller wheel from a bored cylindrical blank; mounting the blank in a work holder such that the axis of said bore is substantially at right angles to the axis of rotation of said work holder and in a plane laterally offset from a parallel plane intersecting the work holder axis of rotation; then presenting the blank to a gashing cutter a plurality of times and simultaneously rotating said blank on said work holder axis to rough form a plurality of impeller vanes; then presenting each vane to a form cutter and simultaneously rotating said vane on said work holder axis to form one of the curved surfaces of the vane; then presenting each vane to a different formed cutter to form a different curved surface of the vane while rotating the vane on said work holder axis; then presenting each vane to a plain cutter and simultaneously rotating the vane on said work holder axis to form one of the plain surfaces of the vane and then presenting each vane to a different plain cutter while simultaneously rotating the vane on said work holder axis to form a different plain surface.

10. In a work holder adapted to present a selected vane of an impeller wheel in a horizontal position; a holder adapted to be secured to a rotatable spindle and having an extended base element; a post on said base; a tail-stock on said base; said holder and spindle having a common axis of rotation; said post angularly disposed to said base such that by indexing the wheel on the post any vane of said wheel is held in said horizontal position and substantially parallel to said base element; means on said post to clamp said wheel hub and without relatively rotating wheel and post during clamping; said tail-stock applying a constant compressive force in the longitudinal direction of said vane; and the longitudinal direction of said vane being substantially coincident with the axis of rotation of said work holder.

11. In a holder for supporting an impeller wheel having a plurality of vanes; a base element adapted for rotation on its own axis; means on said base to support the hub of said wheel and upon which said means the wheel is adapted to be indexed to locate each vane in succession at a cutting position, said means being angularly disposed relative to said base, said angle being of a degree such that each vane at said cutting position will lie in a horizontal plane; said selected vane adapted to rotate on the same axis as said work holder; means to support the free end of said vane and adapted to subject each vane to the same and unvarying compressive force and including means to maintain said force during each cutting operation; said supporting means lying along substantially the same axis as the axis of rotation of said holder and said vane.

12. In a work holding element for an impeller wheel having a plurality of vanes; a longitudinal extended base element; means on said base to hold said wheel; said means holding the plane of said wheel at an angle to the horizontal and against rotation as it is being clamped; means on said base to support the free end of the vanes of said impeller wheel; said means comprising a spring pressed centering element engaging an index center on the end of each vane to locate it at a cutting position; said work holder element being rotatable; and said angularly disposed means and said centering element supporting each individual vane at said cutting position and on an axis of rotation coincident with that of the work holding element.

13. A machine for milling an impeller wheel blank by successive form milling operations to provide individual vanes having milled faces each composed of curved and plane portions comprising a base; a cutter head adjustably mounted on said base; a work holder to carry the impeller wheel reciprocably mounted on said base; a lead screw to reciprocate said work holder; a spindle rotatably mounted in said work holder; means to drive said feed screw at a rapid traverse rate and a plurality of feed rates; means to rotate said work holder spindle about a predetermined center of rotation transverse to the impeller wheel axis, in each successive milling operation, said means including a pair of shaft means transversely disposed of said spindle and individually operatively connected thereto, and stationary cams each coacting with one of said shaft means to axially move said shaft means each in a direction opposite from the other to rotate said spindle in opposite directions as it is reciprocated toward and away from said cutter head.

14. A machine for milling an impeller wheel blank by successive form milling operations to provide individual vanes having milled faces each composed of curved and plane portions, comprising a base; a cutter head thereon; a frame movable toward and away from said cutter head; a spindle rotatably mounted in said frame and adapted to support a work holding fixture to carry the impeller wheel; means to reciprocate said frame, said means comprising a lead screw and means to reversibly rotate said screw at a rapid traverse and a plurality of feed rates; a pair of cams on said base disposed on opposite sides of said frame; follower means in said frame engaging said cams; said follower means operatively associated with said spindle; and said cams being stationary and said followers coacting therewith and acting to rotate said spindle about a predetermined center of rotation transverse to the impeller wheel axis, in each successive milling operation as said frame is reciprocated towards and away from said cutter head.

15. In a machine tool having a work holder to carry the impeller wheel and a cutter movable relatively of each other; means to rotate said cutter; means to reversibly relatively move said cutter and work holder at rapid traverse and a plurality of feed rates; means to rotate said work holder about a predetermined center of rotation transverse to the impeller wheel axis, in each successive milling operation, said means including stationary pattern cams mounted on opposite sides of said work holder; and follower means engaging said cams and having gear element connections to rotate said work holder as said work holder is moved relatively of said cutter.

16. A machine for milling an impeller wheel blank by successive form milling operations to provide individual vanes having milled faces each composed of curved and plane portions, comprising; a base; a cutter on said base; a work support on said base to carry the impeller wheel and mounted for movement relative to said cutter; means to move said work support relatively of said cutter and at a rapid traverse and a plurality of feed rates; means to rotate said work support about a predetermined center of rotation transverse to the impeller wheel axis, in each successive milling operation as it is moved relatively of said cutter; said means to rotate said work support comprising complemental stationary cams, one mounted on each side of said work support; a pair of cam followers in said work support operatively associated therewith and engaging said cams; said followers having gear element connections with the work support adapted to be moved relatively of said work support when said work support moves relatively of said cams.

17. A machine for milling an impeller wheel blank by successive form milling operations to provide individual vanes having milled faces each composed of curved and plane portions, comprising; a base; a cutter on said base; a work support on said base to carry the impeller wheel; means to reciprocate said work support on said base relatively to said cutter; said means including a rapid traverse motor, and a two speed feed motor; means actuable by the work support to selectively change its rate of speed from traverse to fast feed, to slow feed and vice versa; means to rotate said work support about a predetermined center of rotation transverse to the impeller wheel axis, in each successive milling operation as it is moved relatively of said cutter, said means including complemental profiled cams one mounted on each side of said support, cam followers mounted in said work support and engaging said cams, said cams moving said followers relatively of said work support to rotate the work support; said cams profiled such that said work support begins to rotate when said feed rates are initiated by said work support; said slow feed rate initiated just prior to reversal to enable the cutter to clear itself.

18. A machine for milling an impeller wheel blank by successive form milling operations to provide individual vanes having milled faces each composed of curved and plane portions, comprising; a base; an independently adjustably supported cutter head on said base; a frame movable relatively of said base toward and from said cutter head and supporting a rotatable spindle; a rapid traverse motor and a two speed feed traverse motor to relatively move said frame and to selectively rapid traverse, feed traverse and slow feed traverse said frame; a work holder secured to one end of said spindle to carry the impeller wheel; means to rotate said spindle as said frame is reciprocated which includes a pair of profiled cams, one mounted on each side of said frame and secured to said base; a pair of cam followers mounted in said frame and slidable relatively thereof; gear means on said followers engaging a gear on said spindle such that said spindle will be rotated when said followers are moved by said cams; means controllable from the reciprocation of the frame to initiate the feed rate simultaneously with the rotation of the work piece and to initiate the slow feed just prior to reversal of relative movement; and means on one of said followers to eliminate slack between said followers and spindle gears to insure positive rotation of the work spindle at the selected predetermined times.

19. A machine for milling an impeller wheel blank by successive form milling operations to provide individual vanes having milled faces each composed of curved and plane portions, comprising; a base; a cutter head on said base; a frame mounted on said base for movement relative to said cutter head; a transmission means for selectively reversely relatively moving said frame at rapid traverse, fast feed and slow feed rates; a first means on said base and frame to select any one of said rates actuated by the relative movement of said frame and base; a work supporting spindle rotatably mounted in said base; profiled cams mounted on each side of said frame and secured to said base; cam followers slidably mounted in said frame to rotate said spindle as said frame is reciprocated; a work supporting means carried by said spindle, said means comprising a post to support an impeller wheel such that the vanes thereof are horizontally disposed in one selected position of said wheel and a calibrated spring pressed tail-stock center to uniformly compressively support the free end of said vane; one of said first means initiating said fast feed when said cams initiate a turning movement of said work support; another of said first means initiating slow feed when said cutter is near the root of said vane, just prior to the reversal of relative movement and another of said first means initiating a reverse movement of said frame.

20. A machine for milling an impeller wheel blank by successive form milling operations to provide individual vanes having milled faces each composed of curved and plane portions, comprising; a cutter and a work support being relatively movable at traverse, fast feed and slow feed rates; means to rotate said work support including profiled cams actuating followers adapted to rotate said work support as it is being relatively moved; a plurality of dogs on said work support and a trip mechanism on said machine; said work support adapted to mount an impeller wheel such that a selected blade will lie in a horizontal plane and further adapted to uniformly compressively support the free end of said blade; one of said dogs adapted to initiate a fast feed rate when said cams initiate a turning movement of said work support; another dog initiating slow feed rate when said cutter is cutting near the root of said blade; and another dog to reverse said relative movement; said fast feed and slow feed acting in reverse sequence upon reversal of movement.

21. A machine for milling an impeller wheel blank by successive form milling operations to provide individual vanes having milled faces each composed of curved and plane portions, comprising: a base; a cutter on said base; a work holder slidably mounted on said base towards and away from said cutter; a tail-stock center on the work holder to uniformly compressively support the free end of each vane at a cutting position; to carry the impeller wheel transmission means to reciprocate said work holder at feed and traverse rates; profiled cam means on said base parallel to the path of reciprocation; a spindle supporting said holder for rotation; cam follower means to rotate said spindle; said cam follower engaging said cam means and the profile on said cam axially moving said follower to rotate said spindle and work holder about a predetermined center of rotation transverse to the impeller wheel axis, in each successive milling operation.

22. A machine for milling an impeller wheel blank by successive form milling operations to provide individual vanes having milled faces each composed of curved and plane portions, compr:sing a base; a rotatable work holder to carry the impeller wheel and a cutter supported for relative movement on said base; a rapid traverse and a feed traverse transmission for said relative movement; means to rotate said work holder about a predetermined center of rotation transverse to the impeller wheel axis, in each successive milling operation comprising; a cam means on said base disposed parallel to the path of relative movement; cam follower means contacting said cams and connected to said work holder; and said cam profiled such that said work holder is rotating when said feed transmission is active and at rest when said rapid traverse is active, a tail-stock center on the work holder to uniformly compressively support the free end of each vane at a cutting position, with said tail-stock center laterally offset from said center of rotation of the work holder.

23. A method of manufacturing an impeller wheel from a circular blank to provide a plurality of closely positioned vanes emanating from a hub portion, each vane having its front and back faces each composed of a curved portion and a plain portion tangential to the curved portion, which includes performing successive milling operations by a series of separate curved and plain milling cutters operating in succession on the front face and another series of separate curved and plain milling cutters operating in succession on the back face, each milling operation including relative feed between the milling cutter and the impeller wheel in a d'rection substantially radially of the impeller wheel and simultaneously imparting relative movement between the milling cutter and the impeller wheel rotatively about a predetermined axis of generation transverse to the axis of the impeller wheel.

24. The method set forth in claim 23, in which each milling operation on the front face is performed while the impeller wheel is supported on a work holder in a given space relation to the cutters and the impeller wheel is indexed about its axis to position the respective vanes to the cutters and each milling operation on the back face is performed while the impeller wheel is supported in a reversed position on a work holder in a different space relation to the cutters and the impeller wheel is indexed about its axis to position the respective vanes to the cutter.

25. A method of manufacturing an impeller wheel from a circular blank to provide closely positioned vanes emanating from a hub, which comprises: cutting a center bore in the hub, forming a plurality of equally spaced center point holes in the periphery of the blank corresponding with the close positioning of the vanes, supporting the blank to be indexable about the axis of its center bore and also to be rotative about a fixed axis at right angles to said center bore axis and intersecting the wheel blank, applying a center point support in each center point hole in succession to locate and support at a cutting position the vane portion to be milled and maintaining said center point support in fixed relation to the wheel blank when the wheel blank is moved rotatively about said fixed axis, applying a series of milling cutters each in a milling operation on each of the vane portions in succession at said cutting position, the first milling cutter performing a gashing operation from the periphery inwardly into the blank to a predetermined depth and cutting stock at opposite sides of the cutter, a milling cutter performing a finished milling operation on the front face of each vane stock from the periphery to the root of the vane and another milling cutter performing a finished milling operation on the back face of each vane stock from the periphery to the root of the vane, each said milling operation being performed on the respective vane after it has been indexed and while a center point support is applied as defined.

26. A method of manufacturing an impeller wheel as set forth in claim 25, in which the center point support applies a constant compression force to each vane stock lengthwise thereof at each vane milling operation.

27. A method of manufacturing an impeller wheel as set forth in claim 25, including the step of imparting rotative movement to the blank about said fixed axis in predetermined relation to the lengthwise milling of each vane stock to generate the front and back faces of each vane.

28. In a method of manufacturing an impeller wheel from a blank to provide closely positioned vanes integral with a hub portion and with each vane machined on its front and rear face each to provide integrated surfaces one of which is curved and another tangential with respect to the curved surface, which comprises: cutting each front and rear curved surface with separate milling cutters shaped to mill the finished curved surfaces by feed movement lengthwise of each vane, cutting sach front and rear other surface with a separate milling cutter shaped to mill the finished surface tangential to its complemental curved surface, performing each such milling operation in succession on the respective vanes after indexing the wheel blank about its hub center to locate each successive vane in cutting relation to its respective cutter.

29. In a method of manufacturing an impeller wheel from a circular blank to provide closely positioned vanes integral with a hub portion and with each vane machined on its front and rear faces each to provide surfaces one of which is curved and another which is integrated with respect to the curved surface, which comprises:

cutting each front and rear curved surface with separate milling cutters shaped to mill the finished curved surface by feed movement lengthwise of each vane, cutting each front and rear other surface with separate milling cutters shaped to mill the finished surface integrated with respect to its complemental curved surface, performing each such milling operation in succession on the respective vanes after indexing the wheel blank about its hub center to locate each successive vane in cutting relation to its respective cutter, and performing said milling operations on the front face of the vanes while the wheel blank is supported with the leading side of the wheel facing in one direction and reversing the position of the wheel blank when performing the milling operations on the rear face of the vanes.

30. In a method of manufacturing an impeller wheel from a blank to provide a plurality of closely positioned vanes emanating from a hub, each vane having its front and rear faces each composed in cross-section substantially at all points in its length of a curved portion and a portion tangential thereto, which comprises: cutting a a center bore in the blank, cutting a center point hole for each vane in the peripheral portion of the blank equally spaced around the hub bore, supporting the blank on a work post on which the blank may be indexed to position each said center point hole at a cutting position at which to perform a vane milling operation, applying a center point support in each center point hole in succession at said cutting position to accurately locate the respective vane portion to be milled and applying a constant compression force in the lengthwise direction of the vane during the milling operation, cutting the forward and rear curved portions of the vane with separate milling cutters by milling lengthwise of the vane, and then cutting the forward and rear plain portions of the vane with additional separate milling cutters and simultaneously rotating the blank as it is being cut to generate each milled surface lengthwise of the vane and to integrate the finished milled surfaces of each face.

31. A method of manufacturing an impeller wheel as set forth in claim 30, in which said rotative movement of the wheel blank is applied about a given axis which intersects the blank in a plane substantially parallel to and laterally spaced from a plane diagrammatically through the blnk.

32. A method of manufacturing an impeller wheel as set forth in claim 30, in which said rotative movement of the wheel blank is applied about a given axis which intersects the blank in a plane substantially parallel to and laterally spaced from a plane diagrammatically through the blank and in which the center point support is applied at a fixed point equi-distant from said given axis.

33. A method of manufacturing an impeller wheel as set forth in claim 30, in which the recited parts are relatively arranged so that the wheel blank is positioned with a given side facing downwardly on the work post when milling the faces at one side of each vane and is reversely positioned on the wheel post when milling the faces on the other side of each vane.

34. In a method of manufacturing an impeller wheel from a blank to provide a plurality of vanes emanating from a hub, each vane having a face composed in cross-section substantially at all points in its length of a curved portion and a plain portion tangential to the curved portion, which comprises: cutting a center bore in the hub, forming a plurality of center point holes circumferentially spaced in the periphery of the blank corresponding with the number and location of the vanes, supporting the blank on a work holder on which the blank is indexable about the axis of its center bore, supporting the work holder to be rotative about a fixed axis which is identified with a cutting position and extends substantially parallel with the length of a vane location at said cutting position, supporting on the work holder a center point support located to engage in each center point hole in succession upon indexing of the wheel blank to accurately position and support each such vane portion at said cutting position, presenting the vane portion at such cutting position to a curved milling cutter and milling said curved portion by feed lengthwise of the vane, said milling operation being performed in succession on all of the vane portions, presenting the vane portion at said cutting position to a plain milling cutter and milling a plain surface tangential to said curved surface by feed lengthwise of the vane, performing said plain milling operation in succession on all of the vane portions, and imparting rotative movement to the work holder about said fixed axis simultaneously with the lengthwise milling operations to generate an integrated curved and plain surface on each vane.

35. In a method of manufacturing an impeller wheel as set forth in claim 34, in which the index center is in a plane substantially parallel with and laterally offset from a plane passing through said fixed axis, and in which the lengthwise milling feed is in a plane substantially parallel with said plane which passes through the fixed center.

36. In a method as set forth in claim 34, in which each vane has its front and rear faces each composed in cross-section substantially at all points in its length of a curved portion and a plain portion tangential to the curved portion, wherein a separate milling cutter is provided for milling each curved and plain portion for each face of a vane, and wherein the wheel blank is supported with one side at a given location in which to be indexed when performing the milling operations at the front face of the vanes and wherein the wheel blank is reversed in its position to support its other side at said given location in which to be indexed when performing the milling operations at the rear face of the vanes.

37. In a method of manufacturing an impeller wheel from a blank to provide a plurality of vanes emanating from a hub portion, each vane having its front and rear faces each composed in cross-section substantially at all points in its length of a curved portion and a plain portion tangential to the curved portion, which comprises: cutting a center bore in the hub portion, forming a plurality of center point holes circumferentially spaced in the periphery of the blank corresponding with the number and location of the vanes, supporting the blank to be indexable about the axis of its center bore to position each vane portion in succession at a cutting position, providing a center point support adapted to engage in each center point hole in succession upon indexing of the wheel blank to accurately position and support each such vane portion at said cutting position, presenting the vane portion at the cutting position to a gashing milling cutter to mill inwardly from the periphery of the wheel blank to mill one side of said vane portion and the adjacent side of the adjoining vane portion, presenting the vane portion to a concave milling cutter to mill one of said curved surfaces lengthwise of the vane, presenting the vane portion to a convex milling cutter to mill the other curved surface lengthwise of the vane, presenting the vane portion to a plain milling cutter and milling one of said plain surfaces lengthwise of the vane, then presenting the vane portion to a different plain milling cutter to mill the other plain surface lengthwise of the vane, each of said milling operations being performed in succession on each vane portion when it is indexed to a cutting position.

38. Apparatus for manufacturing an impeller wheel from a blank having a bored hub and equally spaced center holes in the periphery determining the location of the vanes, comprising, in combination: a work holder having a mounting spindle, means supporting the spindle for rotative movement about its axis, a work holder fixture extending lengthwise from one end of the spindle, a work post extending from one side of the fixture, means coacting with the work post to clamp the wheel blank to the fixture with the post passing through the hub bore, the wheel blank when unclamped adapted to be indexed on the post to position each vane in succession at a cutting station, a tail-stock on the work fixture remote from its spindle end having a center point adapted to enter in succession each center point hole of the wheel blank to accurately locate each vane at the cutting station; a series of milling cutters each shaped for successive operation at said station to mill a predetermined portion of the vane; and means to effect relative feed between the work holder and each cutter lengthwise of the vane at said station and simultaneous rotative movement of the work holder about its spindle axis.

39. The method of manufacturing from an integral circular blank, an impeller wheel having closely positioned vanes emanating from a hub portion, comprising indexing the blank about its hub center to locate each vane structure in succession at a cutting position, performing gash cutting between adjoining vane structures at said position after each successive indexing, and performing milling operations on each face of the vane structure in a succession of operations using a small diameter milling cutter operable between adjoining vane structures from the peripheral edge to the root thereof, said milling of the face of one of said vane structures being by feed effected lengthwise of the vane structure and generating said milling cut by rotative movement of the blank about an axis lengthwise of the vane structure being milled.

40. Apparatus for manufacturing from a circular blank an impeller wheel having closely positioned vanes integral with a hub portion, including a work holder fixture having a spindle projecting from one end, means rotatably supporting the spindle so that the fixture is rotatable about the spindle axis, the fixture having a work post extending from one side thereof on an axis at right angles to the spindle axis, means coacting with the work post to rigidly clamp the wheel blank to the fixture and to unclamp the blank so that it may be indexed on the post to position each vane in succession at a cutting station, a milling cutter at said station for milling each vane in succession from its peripheral edge to its root, and means for effecting relative feed movement between the cutter and the fixture lengthwise of the vane structure and generating said milling cut by rotative movement of the blank about an axis lengthwise of the vane structure being milled.

41. In a machine for milling an impeller wheel blank by successive milling operations to provide closely positioned vanes emanating from a central hub portion of the blank; a base; a milling cutter rotatably supported on the base; a frame reciprocably mounted on said base toward and from said cutter; a pair of complementary pattern cams mounted on said base on opposite sides of said frame; a spindle rotatably mounted on said frame and supporting a work holder fixture on which the impeller wheel blank is carried; and a pair of cam followers reciprocably mounted in said frame and coacting with the spindle to move it rotatively as said frame is reciprocated with respect to the cutter.

42. In a machine for milling an impeller wheel blank by successive milling operations to provide closely positioned vanes emanating from a central hub portion of the blank; a base; a milling cutter rotatably supported on the base; a frame reciprocably mounted on said base toward and from said cutter; a pair of complementary pattern cams mounted on said base on opposite sides of said frame; a spindle rotatably mounted on said frame and supporting a work holder fixture on which the impeller wheel blank is carried; a pair of cam followers reciprocably mounted in said frame and coacting with the spindle to move it rotatively as said frame is reciprocated with respect to the cutter; and means to move said frame at a rapid traverse and a plurality of feed rates.

43. In a machine for milling an impeller wheel blank by successive milling operations to provide closely positioned vanes emanating from a central hub portion; a base; a tool holder on the base having a milling cutter; a work holder movable on the base toward and from the tool holder comprising a work spindle on an axis parallel with said movement having at its end adjacent to the tool holder an annular flange, a work holder fixture having at one end an annular flange complementary to said spindle flange, means clamping and centering said flanges one against the other, the work holder fixture having a work holding portion extending from its said flange toward the tool holder and equipped with a work supporting post arranged crosswise to the spindle axis adapted to support the impeller wheel blank on the fixture with the blank adapted for indexing about said post to position each vane structure in succession at a milling position, and means for clamping the blank in each such indexed position; means for moving the work holder to position the blank in operative relation to the cutter; and means for imparting rotative movement to the work spindle in a controlled feed movement wherein the cutter generates a predetermined vane surface.

CHARLES B. DE VLIEG.